US008018947B2

(12) United States Patent
Willis

(10) Patent No.: US 8,018,947 B2
(45) Date of Patent: *Sep. 13, 2011

(54) DEVICE FOR PERFORMING IP FORWARDING AND ATM SWITCHING

(75) Inventor: Steven R. Willis, Acton, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 80 days.

This patent is subject to a terminal disclaimer.

(21) Appl. No.: 12/510,342

(22) Filed: Jul. 28, 2009

(65) Prior Publication Data

US 2010/0020802 A1    Jan. 28, 2010

Related U.S. Application Data

(63) Continuation of application No. 11/126,352, filed on May 11, 2005, now Pat. No. 7,586,919, which is a continuation of application No. 09/336,229, filed on Jun. 18, 1999, now Pat. No. 6,909,720.

(60) Provisional application No. 60/090,028, filed on Jun. 19, 1998.

(51) Int. Cl.
*H04L 12/28* (2006.01)
*H04L 12/56* (2006.01)
*H04J 3/02* (2006.01)
*H04J 3/14* (2006.01)

(52) U.S. Cl. .................. 370/395.1; 370/466; 370/474; 370/538

(58) Field of Classification Search .................. None
See application file for complete search history.

(56) References Cited

U.S. PATENT DOCUMENTS

| 4,998,242 A | 3/1991 | Upp |
| 5,081,654 A | 1/1992 | Stephenson et al. |
| 5,255,264 A | 10/1993 | Cotton et al. |
| 5,278,824 A | 1/1994 | Kremer |
| 5,367,520 A | 11/1994 | Cordell |
| 5,526,351 A | 6/1996 | Mochinaga et al. |
| 5,703,879 A | 12/1997 | Proctor et al. |
| 5,729,546 A | 3/1998 | Gupta et al. |
| 5,740,156 A | 4/1998 | Tanabe et al. |
| 5,751,709 A | 5/1998 | Rathnavelu |

(Continued)

FOREIGN PATENT DOCUMENTS

AU    A-48511/97    6/1998

(Continued)

OTHER PUBLICATIONS

Steven R. Willis, co-pending U.S. Appl. No. 11/126,352, filed May 11, 2005, entitled "Device for Performing IP Forwarding and ATM Switching".

(Continued)

*Primary Examiner* — Chi Pham
*Assistant Examiner* — Soon-Dong Hyun
(74) *Attorney, Agent, or Firm* — Harrity & Harrity, LLP

(57) ABSTRACT

A communication node contains intelligence for directing both internet protocol (IP) packets and Asynchronous Transfer Mode (ATM) cells toward their destinations. The ATM cells and IP packets may be received within a common data stream. The respective devices process the ATM cells and IP packets to direct the cells and packets to the proper output ports towards their destinations. The device is capable of performing policing and quality of service (QOS) processing on both the ATM cells and the IP packets.

20 Claims, 27 Drawing Sheets

U.S. PATENT DOCUMENTS

| | | | |
|---|---|---|---|
| 5,764,645 | A | 6/1998 | Bernet et al. |
| 5,828,844 | A | 10/1998 | Civanlar et al. |
| 5,920,705 | A | 7/1999 | Lyon et al. |
| 5,936,965 | A | 8/1999 | Doshi et al. |
| 5,940,389 | A | 8/1999 | Yang et al. |
| 6,002,692 | A | 12/1999 | Wills |
| 6,049,542 | A | 4/2000 | Prasad |
| 6,052,364 | A | 4/2000 | Chalmers et al. |
| 6,052,373 | A | 4/2000 | Lau |
| 6,052,375 | A | 4/2000 | Bass et al. |
| 6,075,630 | A | 6/2000 | Nishio |
| 6,075,788 | A * | 6/2000 | Vogel ............... 370/395.51 |
| 6,115,373 | A | 9/2000 | Lea |
| 6,122,251 | A | 9/2000 | Shinohara |
| 6,125,112 | A | 9/2000 | Koning et al. |
| 6,134,238 | A | 10/2000 | Noh |
| 6,205,150 | B1 | 3/2001 | Ruszczyk |
| 6,205,154 | B1 | 3/2001 | Schmidt et al. |
| 6,219,728 | B1 | 4/2001 | Yin |
| 6,266,333 | B1 | 7/2001 | Kartalopoulos |
| 6,272,151 | B1 | 8/2001 | Gupta et al. |
| 6,331,978 | B1 * | 12/2001 | Ravikanth et al. ............ 370/392 |
| 6,331,989 | B1 | 12/2001 | Tezuka |
| 6,343,326 | B2 | 1/2002 | Acharya et al. |
| 6,381,244 | B1 | 4/2002 | Nishimura |
| 6,408,005 | B1 | 6/2002 | Fan et al. |
| 6,418,145 | B1 | 7/2002 | Isoyama et al. |
| 6,463,096 | B1 | 10/2002 | Raleigh et al. |
| 6,477,168 | B1 | 11/2002 | Delp et al. |
| 6,487,198 | B1 | 11/2002 | Pierson, Jr. |
| 6,498,792 | B1 | 12/2002 | Johnson et al. |
| 6,607,298 | B2 | 8/2003 | Shinohara |
| 6,611,522 | B1 | 8/2003 | Zheng et al. |
| 6,658,021 | B1 | 12/2003 | Bromley et al. |
| 6,667,956 | B2 * | 12/2003 | Beshai et al. ............... 370/238 |
| 6,771,663 | B1 | 8/2004 | Jha |
| 6,909,720 | B1 | 6/2005 | Willis |
| 6,975,631 | B1 * | 12/2005 | Kastenholz ............... 370/401 |
| 6,980,543 | B1 | 12/2005 | Kastenholz et al. |
| 7,065,037 | B1 * | 6/2006 | Viswanathan et al. ........ 370/217 |
| 7,100,020 | B1 * | 8/2006 | Brightman et al. ............. 712/18 |
| 2002/0041604 | A1 | 4/2002 | Ferguson |

FOREIGN PATENT DOCUMENTS

| | | |
|---|---|---|
| EP | 0 797 373 | 9/1997 |
| WO | WO 94/03004 | 2/1994 |
| WO | WO 9813975 | 4/1998 |

OTHER PUBLICATIONS

Newton, Newton's Telecom Dictionary, Flatiron Publishing, a division of Miller Freeman, Inc., 14$^{th}$ Edition, pp. 663 and 664.

U.S. Appl. No. 09/335,847, filed Jun. 18, 1999; Gregg Bromley et al.; "Method and System for Encapsultating/Decapsulating Data on a Per Channel Basis in Hardware;" 59 pages.

Kato et al. "TCP Gateway Improving Throughput of TCT/IP Over Wide Area ATM Networks," XVI World Telecom Congress Proceedings, vol. 1 1997 pp. 35-42.

Keshav "Issues and Trends in Router Design," IEEE Communications Magazine, vol. 36(5) 1998 pp. 144-151.

Parulkar "A Strategy for Integrating IP with ATM," Computer Communication Review, vol. 25(4) 1995 pp. 49-58.

White "ATM Switching and IP Routing Integration: The Next Stage in Internet Evolution?," IEEE Communications Magazine, vol. 36(4) 1998 pp. 79-83.

Office Action from U.S. Appl. No. 10/665,349, dated Dec. 15, 2009, 27 pages.

* cited by examiner

DEVICE FOR PERFORMING IP FORWARDING AND ATM SWITCHING

RELATED APPLICATIONS

This application is a continuation of U.S. patent application Ser. No. 11/126,352 filed May 11, 2005, now U.S. Pat. No. 7,586,919 which is a continuation of U.S. patent application Ser. No. 09/336,229 filed Jun. 18, 1999, now U.S. Pat. No. 6,909,720 which claims the benefit of priority under 35 U.S.C. 119(e) to U.S. Provisional Application Ser. No. 60/090,028, filed Jun. 19, 1998, and is related to U.S. patent application Ser. No. 09/237,128, filed Jan. 25, 1999, and entitled "NETWORK PACKET FORWARDING LOOKUP WITH A REDUCED NUMBER OF MEMORY ACCESSES," U.S. patent application Ser. No. 09/336,090, filed Jun. 18, 1999, and entitled "AN INTERCONNECT NETWORK FOR OPERATION WITHIN A COMMUNICATION NODE," U.S. patent application Ser. No. 09/336,311, filed Jun. 18, 1999, now U.S. Pat. No. 6,611,522, issued Aug. 26, 2003, and entitled "A QUALITY OF SERVICE FACILITY IN A DEVICE FOR PERFORMING IP FORWARDING AND ATM SWITCHING," and U.S. patent application Ser. No. 09/335,947, filed Jun. 18, 1999, now U.S. Pat. No. 6,658,021, issued Dec. 2, 2003, and entitled "METHOD AND SYSTEM FOR ENCAPSULATING/DECAPSULATING DATA ON A PER CHANNEL BASIS IN HARDWARE." The entire contents of each of said applications are hereby incorporated by reference.

TECHNICAL FIELD

The present invention relates generally to switching nodes and more particularly to a single device for performing IP forwarding and ATM switching.

BACKGROUND OF THE INVENTION

In conventional systems, computer networks typically have been viewed as being divisible into several layers. The Open Systems Interconnection (OSI) reference model was established by the International Standards Organization (ISO). The OSI reference model defines a computer network as having seven layers ranging from a physical layer to an application layer. A number of different protocols have been developed for use at the respective layers of a computer network. The Asynchronous Transfer Mode (ATM) protocol is a layer 2 protocol. Layer 2 is the data link layer and is responsible for transmitting chunks of information over a data link. The Internet Protocol (IP) is an example of a layer 3 protocol. Layer 3 is the network layer, which is responsible for enabling any pair of systems in the computer network to communicate with each other.

In conventional systems, ATM networks had been viewed as separate universes from IP networks. ATM networks work well for a subset of services, and IP networks work well for a different subset of services. Given that neither IP nor ATM offer a complete multiservice solution, many service providers choose to operate dual networks. IP networks supports applications such as Internet access and virtual private networks, whereas ATM networks supports frame relay, virtual private networks, circuit emulation, private branch exchange (PBX) and other applications where reliability and quality of the service (QOS) are a priority.

SUMMARY OF THE INVENTION

The present invention provides a device that not only can perform IP packet forwarding and routing but can also perform ATM switching and routing. The device of the present invention allows a network developer to not commit exclusively to a single protocol; rather the device of the present invention allows the developer to support a number of different protocols within a single device. The device of the present invention provide a true multi-source capability. The device is capable of handling ATM, IP packet over SONET and the routing of IP packets over ATM.

In accordance with one aspect of the present invention, a device for directing input data towards destinations includes an IP packet forwarding facility for forwarding IP packets in input data towards their destinations. The device also includes an ATM cell switching facility for switching ATM cells in the input data towards their destinations. The input data may include synchronous optical network (SONET) frames.

In accordance with another aspect of the present invention, an apparatus for directing input towards destinations includes input ports for receiving input and output ports for outputting data. The apparatus also includes a director which is coupled to a selected one of the input ports for directing the input to the output ports. The director directs layer 2 data units encapsulated by an OSI layer 2 protocol to the output ports based on address information in the layer 2 data units. The director also directs layer 3 data units encapsulated by an OSI layer 3 protocol to the output ports based on address information in the layer 3 data units. The layer 2 protocol may be the ATM protocol and the layer 3 protocol may be IP.

In accordance with a further aspect of the present invention, a method is performed in a device for directing input data traffic received on input ports to output ports. An IP lookup is provided for identifying where to direct an IP packet that was received on a selected input port. An ATM lookup is provided for identifying where to direct an ATM cell that is received on the selected input port. A unit of input data is received by the selected input port. If the unit of data is an ATM cell, the ATM lookup is used to identify which of the output ports to direct the unit of data. Where the unit of data is an IP packet, the IP lookup is uses to identify the output port towards which to direct the unit of data.

In accordance with a further aspect of the present invention, a device is provided for directing both IP packets containing address information identifying destinations and ATM cells containing address information identifying destinations toward their destination. The device includes input ports for receiving streams of input data and output ports for outputting streams of data. The device also includes line cards for directing input data received at the input ports to the output ports. Each line card includes an IP packet forwarding facility of directing IP packets in the input data to the output ports based on the address information contained in the IP packets. Each line card additionally includes an ATM cell forwarding facility for directing ATM cells in the input data to the output ports based on the address information contained in the ATM cells. The device may include an interconnect for interconnecting line cards to facilitate communication among the line cards. A multiplexer may be positioned before select one of the input ports to multiplex data streams into a single input data stream. The input data may be received as an OC-48 data stream.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides a single device for performing both internet protocol (IP) forwarding/routing and asynchronous transfer mode (ATM) switching/routing. The single device contains both an IP packet forwarding facility and an ATM switching facility. In this context, "forwarding" refers to the passing of packets between a source port and one or more destination ports in a communication node, such as a switch, a router or a switch/router. "Routing" refers to the accumulation of topology information to provide information to a forwarding table or similar structure by a communication node that is used for directing input data toward a destination. "Switching" refers to the directing of packets or other modularized information through intermediary switching nodes to connect a sender with a receiver in a connection-oriented environment.

The illustrative embodiment eliminates the need for having separate switches and routers. The device employed in the illustrative embodiment can handle both ATM cells and IP packets in a single device and also can handle IP packets carried by ATM cells. The device may be employed in IP networks, such as the internet, intranet or extranet, or more traditional switching environments, such as virtual private networks (VPNs), private data networks. The device supports routing of IP packets over a SONET (Synchronous Optical Network), the routing of IP packets over ATM and pure ATM switching. More generally, the illustrative embodiment eliminates the separation between layer 2 devices and layer 3 devices so that layer 2 data units and layer 3 data units may be directed toward their destinations by a single device.

The illustrative embodiment employs a switch/router suitable for use in a communications network such as a computer network or a telephone network. The switch/router includes input ports for receiving input data traffic and output ports for directing the input data traffic towards destinations. Each input data port is tied to a communications line, such as a fiber optic line. Similarly, each output port is tied, likewise, to a communication line (e.g. a fiber optic line). An ATM cell forwarding facility and an IP packet forwarding facility are provided for each input port. The ATM cell forwarding facility determines, for each ATM cell received by the input port, which output port to use for outputting the ATM cell. The IP packet forwarding facility determines, for each IP packet received by the input port, which output port to use for outputting the IP packet. Hence, each input port may receive both ATM cells and IP packets and the switch/rates will properly direct the AMT cells and IP packets.

The discussion below summarizes the architecture and operation of the switch/routes device of the illustrative embodiment.

Figure 1:
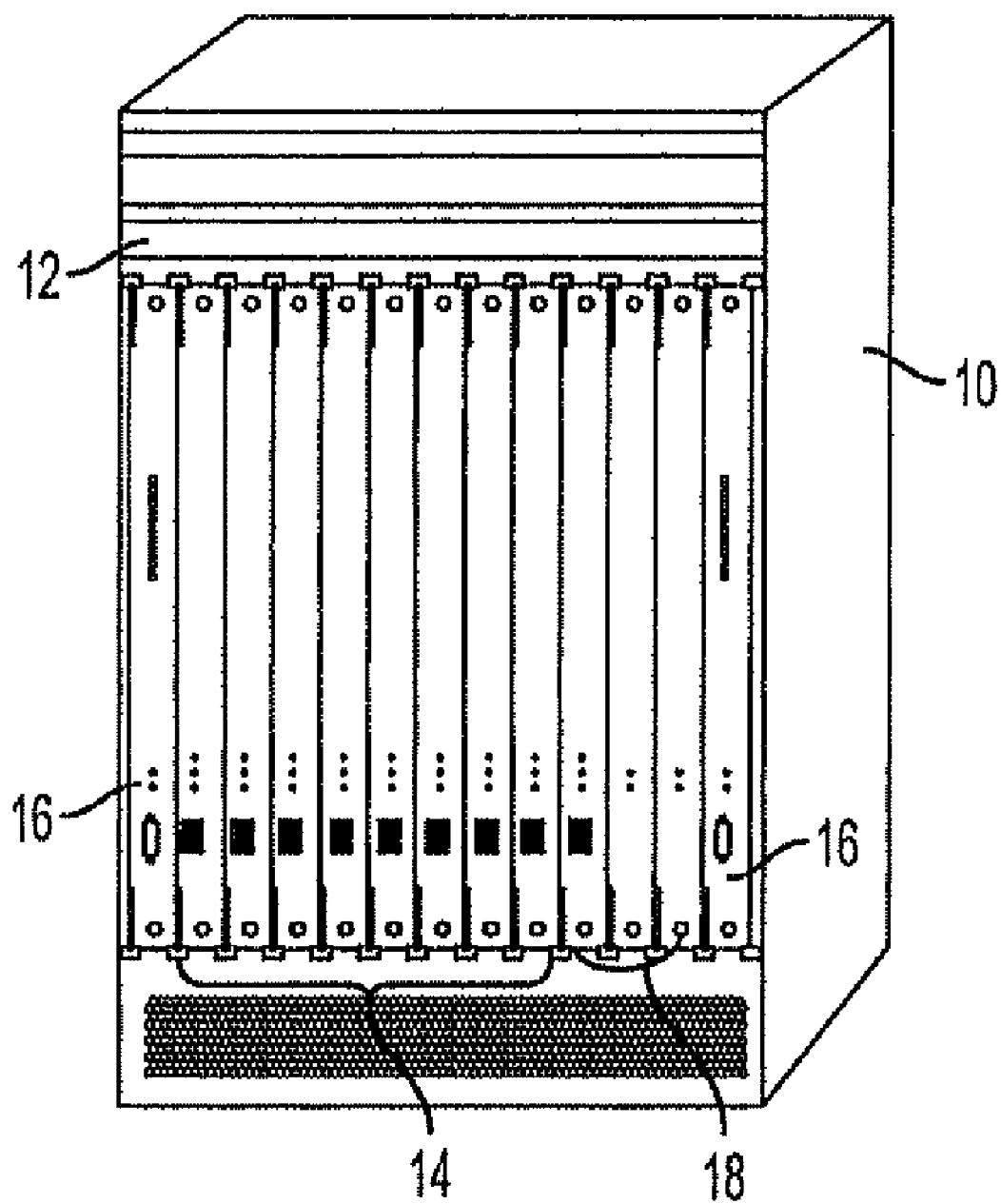
FIG. 1 depicts a switching shelf for use in the illustrative embodiment of the present invention.

FIG. 1 depicts a switching shelf 10 that is suitable for use in the switch/router device of the illustrative embodiment. The switching shelf 10 provides core switching functionality for the device. As will be explained in more detail below, the device may include multiple switching shelves to increase the switching capacity of the device. This modularizing of the switching functionality allows a network provider to choose the switching capacity that is appropriate for the needs of the network provider. The switching shelf 10 includes a housing 12 for holding the components of the switching shelf, including eight line cards 14. The eight line cards 14 are printed circuit boards that contain the intelligence for receiving and transmitting data. Each line card 14 is designed to receive/transmit an OC-48 input stream, corresponding to 2.488 gigabits per second (Gbps). SONET is a standard that defines a family of fiber optic transmission rates that facilitate the internetworking of transmission products for multiple vendors. SDH is a standard that is technically consistent with SONET. The optical transmission rates are known as optical carry (OC) rates. The SONET/SDH OC rates are defined as follows:

| OC Level | Line Rates | Capacity |
|---|---|---|
| OC-1 | 51.84 Mbps | 28 DS1s or 1 DS3 |
| OC-3 | 155.52 Mbps | 84 DS1s or 3 DS3s |
| OC-9 | 466.56 Mbps | 252 DS1s or 9 DS3s |
| OC-12 | 622.08 Mbps | 336 DS1s or 12 DS3s |

-continued

| OC Level | Line Rates | | Capacity |
| --- | --- | --- | --- |
| OC-18 | 933.12 | Mbps | 504 DS1s or 18 DS3s |
| OC-24 | 1.244 | Gbps | 672 DS1s or 24 DS3s |
| OC-36 | 1.866 | Gbps | 1008 DS1s or 36 DS3s |
| OC-48 | 2.488 | Gbps | 1344 DS1s or 48 DS3s |
| OC-96 | 4.976 | Gbps | 2688 DS1s or 96 DS3s |
| OC-192 | 9.953 | Gbps | 5376 DS1s or 192 DS3s |

As can be seen in the above-identified table, OC-48 is one of the specified line rates. In the capacity column of the table, references are made to DS-1 and DS-3 rates. These are SONET/SDH capacities expressed in terms of line rates in the Plesiochronous Digital Hierarchy (PDH) of digital signal speeds that is used to classify capacities of lines or trunks. The fundamental speed level in the DS hierarchy is DS-0, which corresponds to 64 kilobits per second. DS-1 corresponds to 1.54 megabits per second, and DS-3 corresponds to 44.736 mbps.

The switching shelf 10 also contains switching module cards 18 that occupy 3 slots. Switching module cards 18 are printed circuit boards that provide switching capacity to facilitate communication between line cards. The switching module cards 18 form the core of the "interconnect," which will described in more detail below. Switch resource modules 16 occupy the remaining two slots in the switching shelf 10. These modules 16 manage board level status information for the switching shelf 10.

Figure 2:
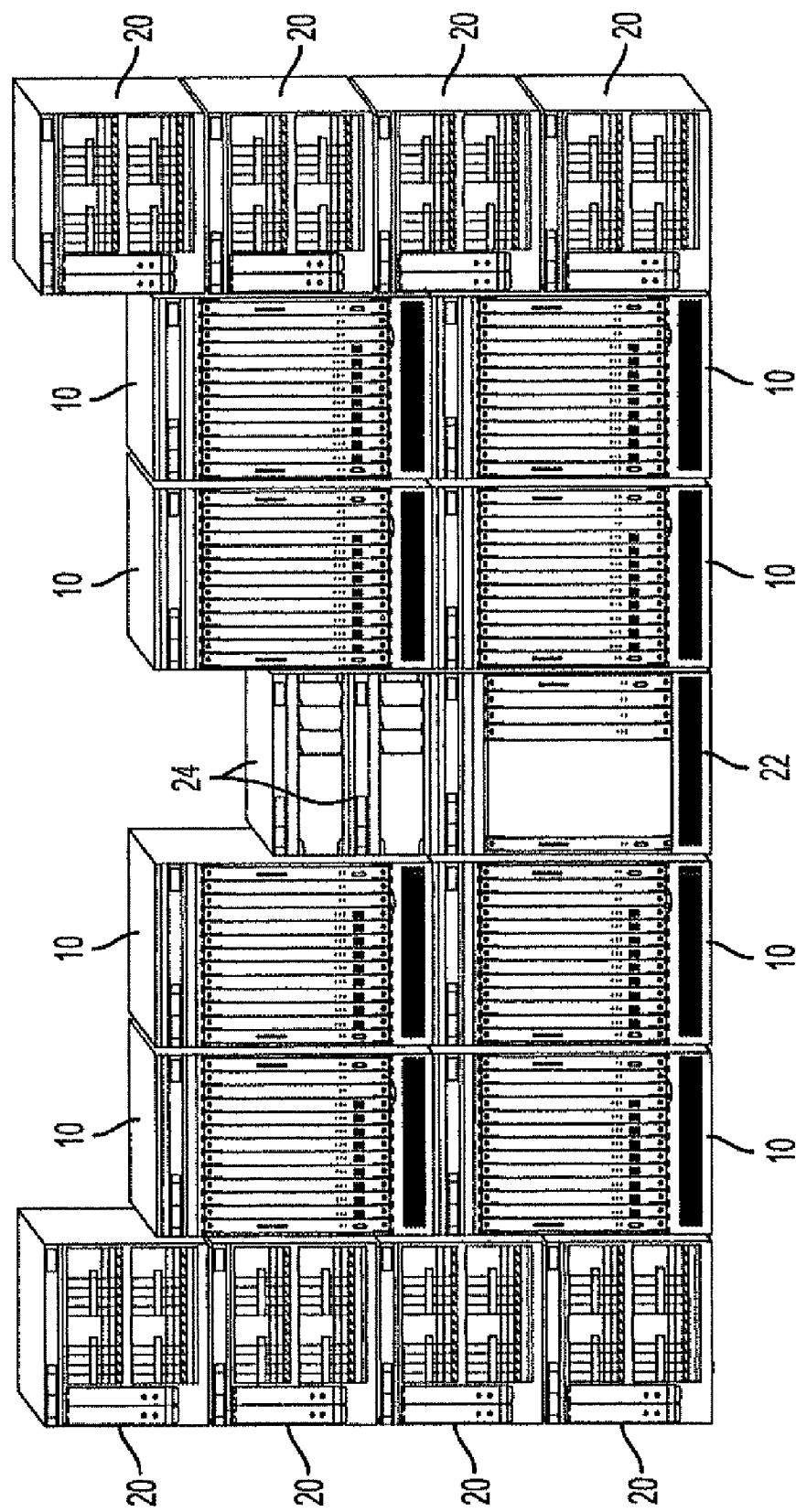
FIG. 2 depicts an implementation of the device of the illustrative embodiment in which multiple switching shelves are employed.

As was mentioned above, additional switching shelves 10 may be employed in the device to increase the switching capacity of the device. FIG. 2 shows an example wherein eight switching shelves 10 are employed. Access shelves 20 are also employed in the device. Each access shelf 20 has a pair of linear terminal multiplexers that create a structured OC-48 data stream individual OC-12/STM4, OC-2/STM1, DS-3 and/or E3 tributaries. In the example depicted in FIG. 2, eight access shelves 20 are employed. An access shelf 20 is provided for each corresponding switching shelf 10. The device also contains a number of control shelves 24. Each control shelf 24 contains a dual redundant pair of control processors. Extension shelf 22 is a 160 Gbps switch for interconnecting the up to 8 switching shelves 10. The extension shelf 22 allows an input data stream to be received on a line card in a first of the switching shelves 10 and output from a line card on a second of the switching shelves.

Figure 3:
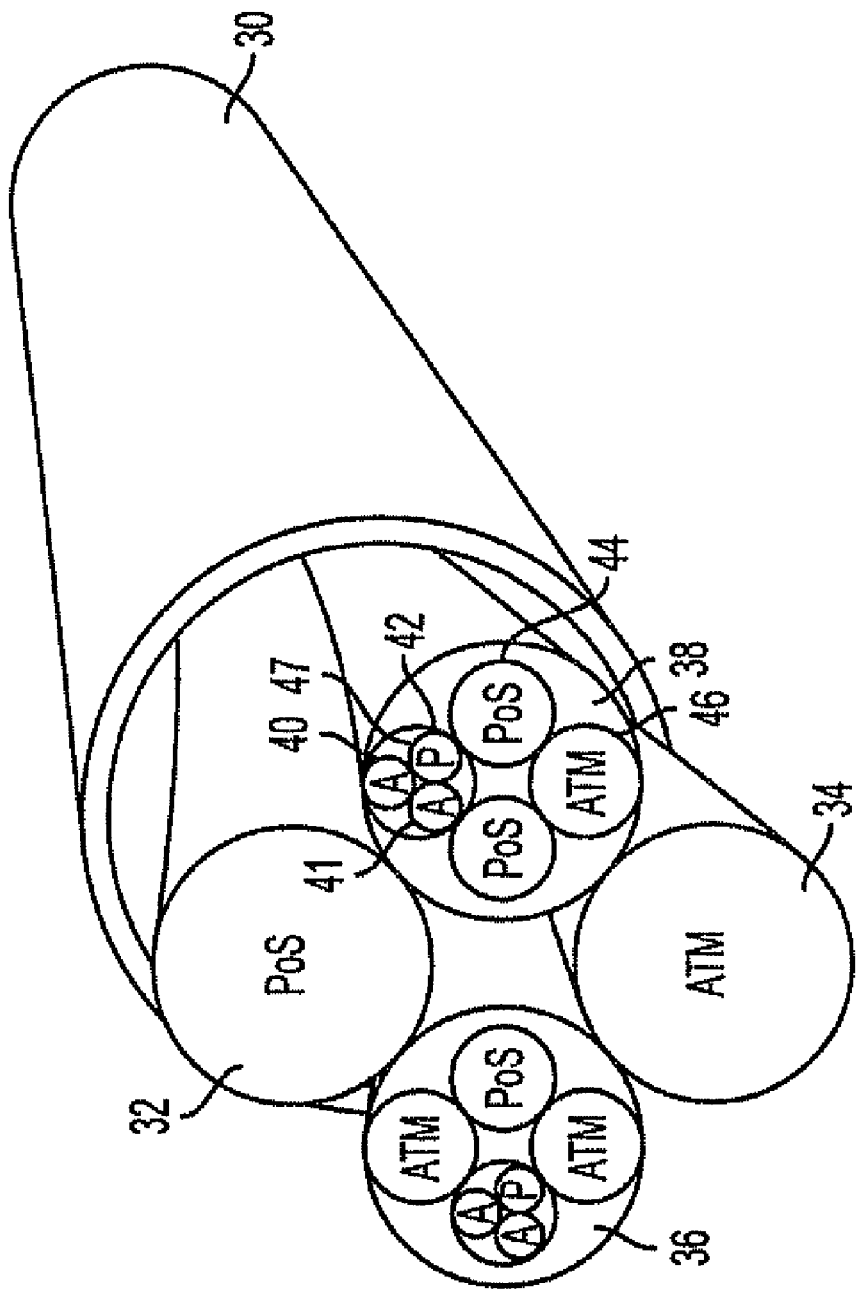
FIG. 3 depicts the channelized SONET scheme used in the illustrative embodiment.

The device of the illustrative embodiment provides a channelized SONET/SDH mode of operation, such that each OC-48 line card module can be configured for DS-3, OC-3 and OC-12 or OC-48 tributary configuration. FIG. 3 shows an example of such channelation. A single OC-48 input stream 30 has tributaries that include an OC-12C packet over SONET tributary 32 and an OC-12 ATM tributary 34. Tributary 38 is divided into four OC-3 tributaries including OC-3C packet over SONET tributary 44 and an OC-3 ATM tributary 46. Tributary 47 is divided into three DS-3 tributaries including an ATM HEC delineated tributary 40, a DS-3 ATM PLCP delineated tributary 41 and a PPP over DS-3 tributary 42. Each on the line card modules 14 demultiplexes the OC-48 input stream into the specified tributaries and then operates on the tributaries (i.e. "channels") separately. The configuration of the tributaries is software controlled and may be dynamically altered.

Figure 4:
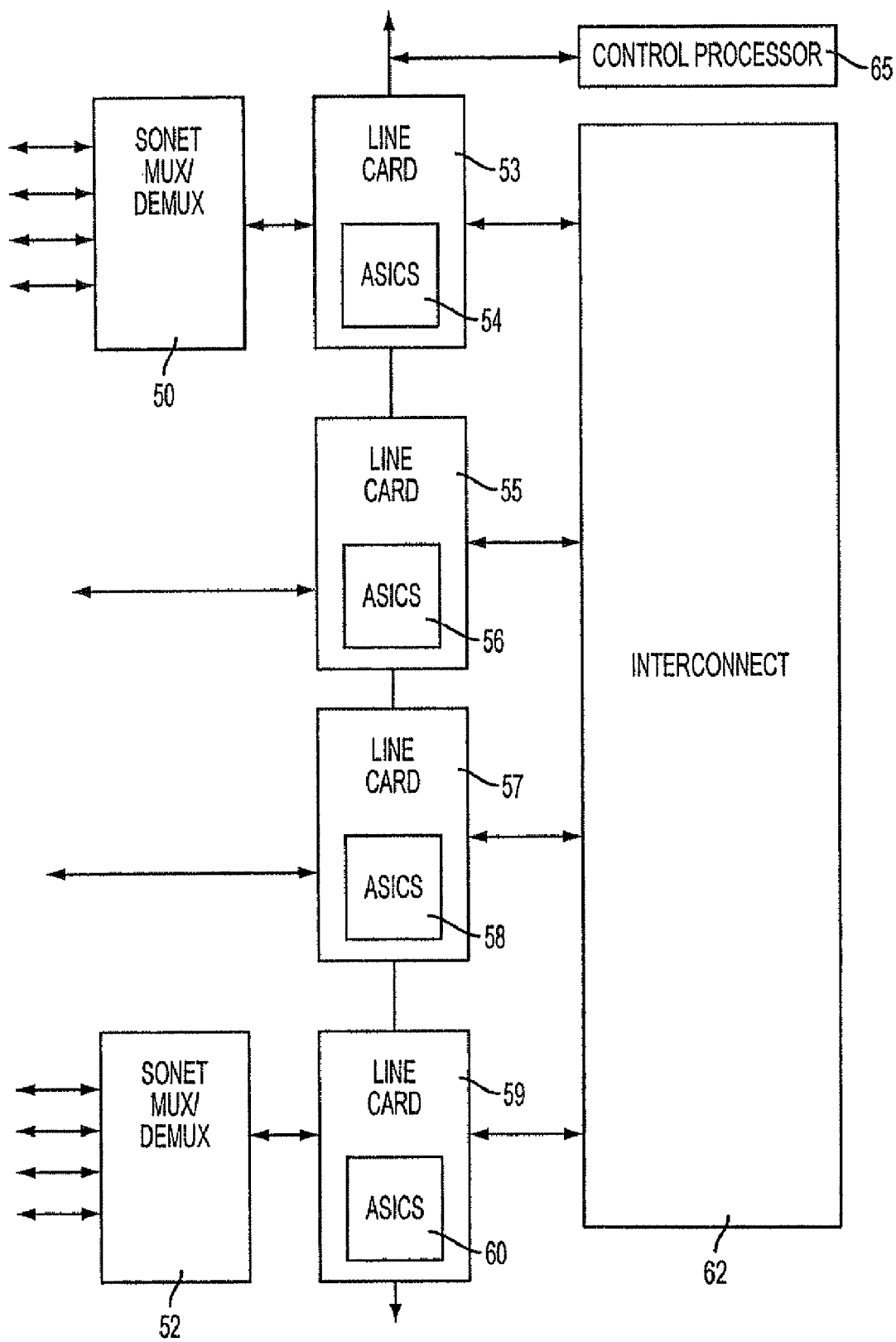
FIG. 4 depicts multiplexers and a switching shelf with four line cards.
Figure 5:
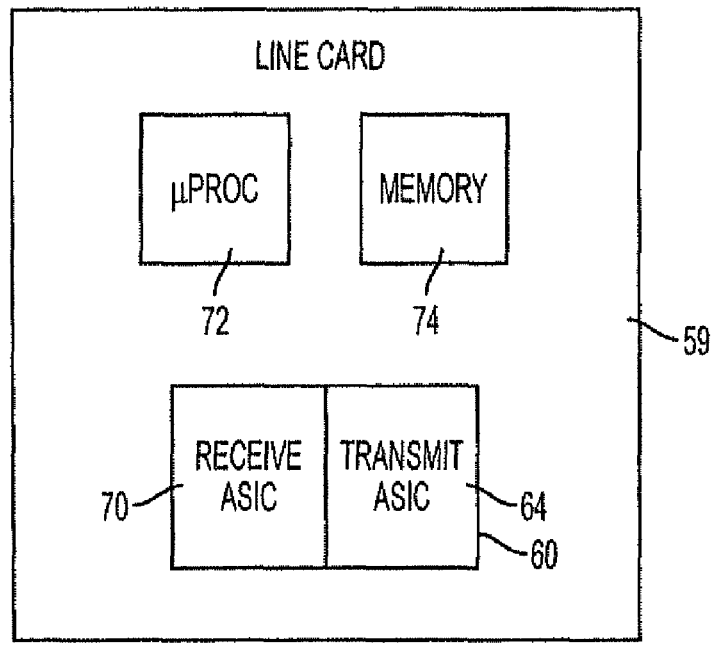
FIG. 5 depicts components of a line card in more detail.

FIG. 4 illustrates an example of the portion of the functional layout for the device of the illustrative embodiment. The device include line cards 53, 55, 57 and 59 that are coupled to input communication lines. Each line card 53, 55, 57 and 59 receives a single physical OC-48 data stream via an input port. FIG. 5 depicts some additional components found on the line card 59 in more detail. Each of the other line cards 53, 55, and 57 is presumed to have a similar layout. The line card 59 includes a microprocessor 72 and a memory 74. The memory 74 may take many different forms including random access memory (RAM) or read only memory (ROM). The line card 59 includes application specific integrated circuits (ASICs), including a receive ASIC 70 and a transmit ASIC 64. The receive ASIC 70 is responsible for receiving incoming data and processing the data so that the data is ready to be transferred over the interconnect 62. The transmit ASIC 64 receives data from the interconnect 62 and forwards data out over an output port to an output line. As mentioned above each of the line cards 53, 55 and 57 has a similar architecture to that depicted in FIG. 5. Hence, line card 53 includes ASIC 54, line card 55 includes ASIC 56 and line card 57 includes ASIC 58.

Those skilled in the art will appreciate that the depiction of the line card 59 shown in FIG. 5 is considered to be merely illustrative and not limiting of the present invention. Other line card configurations may be used to practice of the present invention. Moreover, the functionality provided by the line card need not be implemented on a line card per se but rather may be implemented in a different fashion or by a different hardware configuration. In addition, the receive ASIC 70 and the transmit ASIC 64 need not be implemented as separate two ASICs but rather may be implemented as more than two ASICs or as a single ASIC.

The line cards 53 may have SONET multiplexers, such as multiplexers 50 and 52 positioned at the input of the input ports for the line cards to multiplex the incoming tributary data streams into OC-48 data streams. In the example depicted in FIG. 4, SONET multiplexer 50 multiplexes 4 OC-12 data streams into an OC-48 data stream. Control processor 65 oversees operation of the line cards and 53, 55, 57 and 59 interconnect 62. Demultiplexers 50 and 52 are positioned at the feeds into the output ports to take OC-48 output from the line card and split it into constituent tributaries, such as OC-12, OC-3 or DS-3 tributaries.

An example is helpful to illustrate data flow through the components depicted in FIG. 4. Suppose that four OC-12 data streams are multiplexed into a single OC-48 input data stream at the input port for line card 59. The receive ASIC 70 on line card 59 determines how to direct ATM cells and/or IP packets in the input data stream. The data is passed over the interconnect 62 to a destination line card, such as line card 53. The transmit ASIC 64 on the line card 53 packages the data (i.e. encapsulates) in a format that is appropriate for the destination. The data is then sent out over the output ports. A multiplexer 50 may multiplex the output data from the OC-48 stream coming out of the line card onto a physical OC-12 port.

Figure 6:
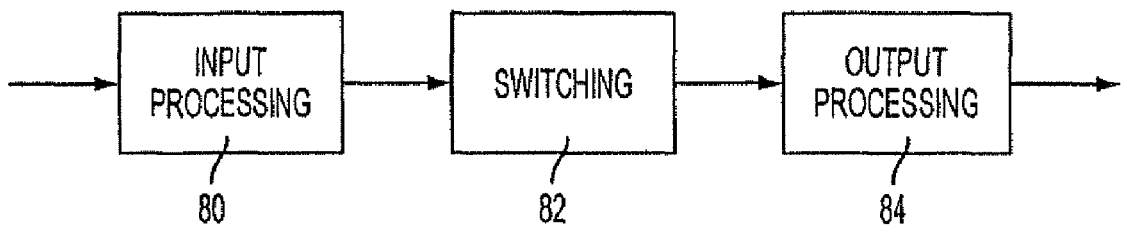
FIG. 6 depicts the three primary stages of processing performed on input traffic.

FIG. 6 depicts the three primary stages involved in processing an input data stream with the device. Initially, input processing 80 is performed. As will be described in more detail below, the input processing 80 locates ATM cells and IP packets within the incoming data stream and decapsulates and segments the incoming packet data. The input processing 80 places the data in a suitable format to direct the data over the interconnect 62. IP forwarding and ATM switching lookups are performed as part of the input processing 80. The interconnect stage 82 directs the input data over the interconnect 62 to the appropriate output line cards. Output processing 84 involves encapsulating the data received over the interconnect and directing the data out the appropriate output ports so that the data reaches the intended destinations. The discussion below will describe these stages in more detail.

Figure 7:
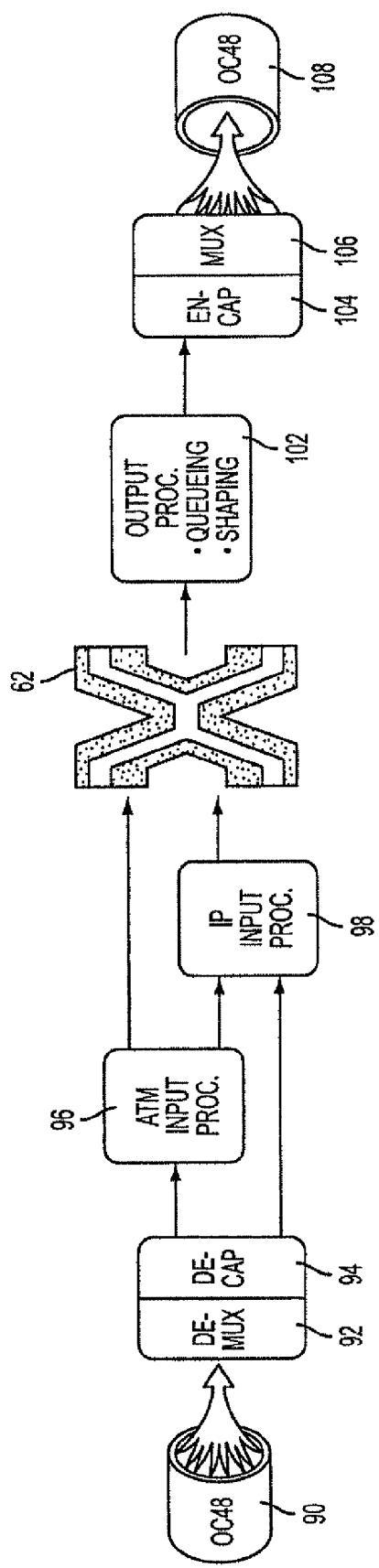
FIG. 7 is functional diagram illustrating steps performed on data traffic.

FIG. 7 provides a functional diagram that exhibits the lifetime of processing from input to output for a given data stream in the illustrative embodiment. The OC-48 input data stream 90 is first demultiplexed 92 into the separate tributaries (also known as "channels"). The data within each of the channels is decapsulated 94 to remove the data from SONET frames and layer 2 frames. ATM input processing 96 is performed on ATM cells in the input data and IP input processing 98 is performed on IP packets in the input data. Data passes over the interconnect 62 to an output line card. The output line card performs output processing 102, which includes queuing and traffic shaping 102. Encapsulation 104 is performed on the data and the respective tributaries are multiplexed 106 to produce an OC-48 output data stream 108.

Figure 8:
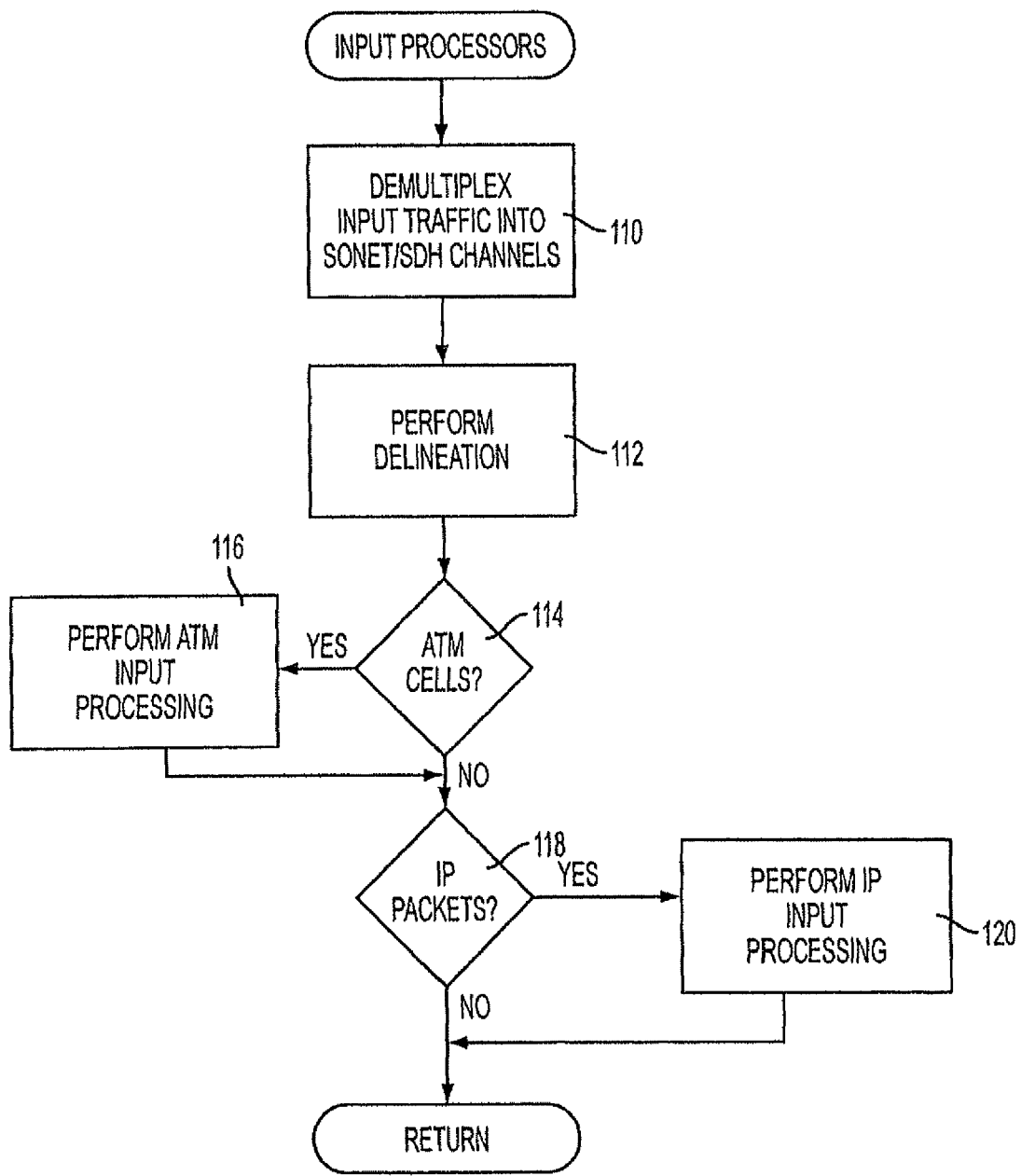
FIG. 8 is a flowchart illustrating the steps that are performed during input processing.
Figure 9:
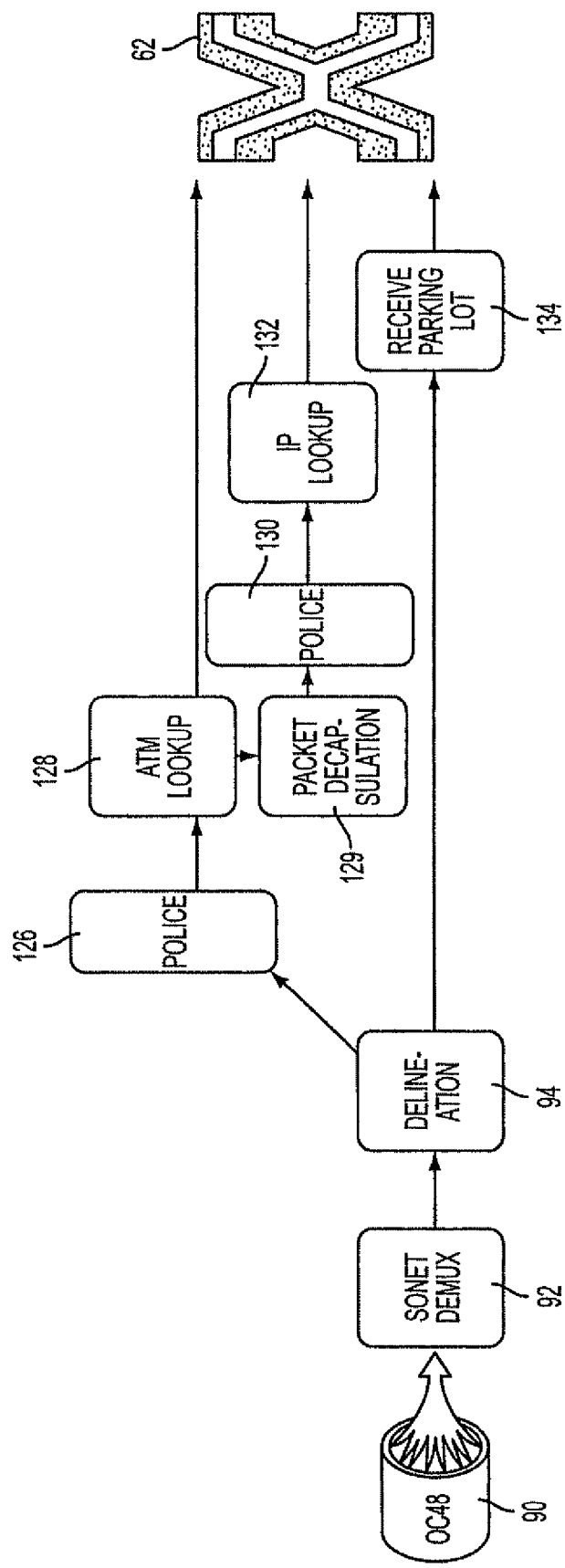
FIG. 9 is a functional diagram illustrating functional steps performed during input processing.

The illustrative embodiment leverages the infrastructure of SONET/SDH to support multiple data encapsulations. It is presumed that the incoming data is encoded in a SONET format. FIG. 8 is a flowchart that illustrates the steps that are performed during input processing in the illustrative embodiment. Initially, the incoming data must be demultiplexed into the respective SONET/SDH tributaries. (step 110 in FIG. 8). Input processing is in effect performed on all of the tributaries simultaneously. FIG. 9 depicts a functional diagram of the input processing that is more detailed than the diagram of FIG. 7. The OC-48 data stream 90 is shown as being logically demultiplexed by SONET demultiplexers 92.

The resulting data in the respective tributaries may be in any of a number of different formats. The receive ASIC 70 delineates this data (step 112 in FIG. 8) to gain access to the ATM cells, PPP frames or FR frames carried therein (see 94 in FIG. 7). Each IP packet may be composes of multiple ATM cells or may be contained in a PPP frame or FR frame.

Figure 11:
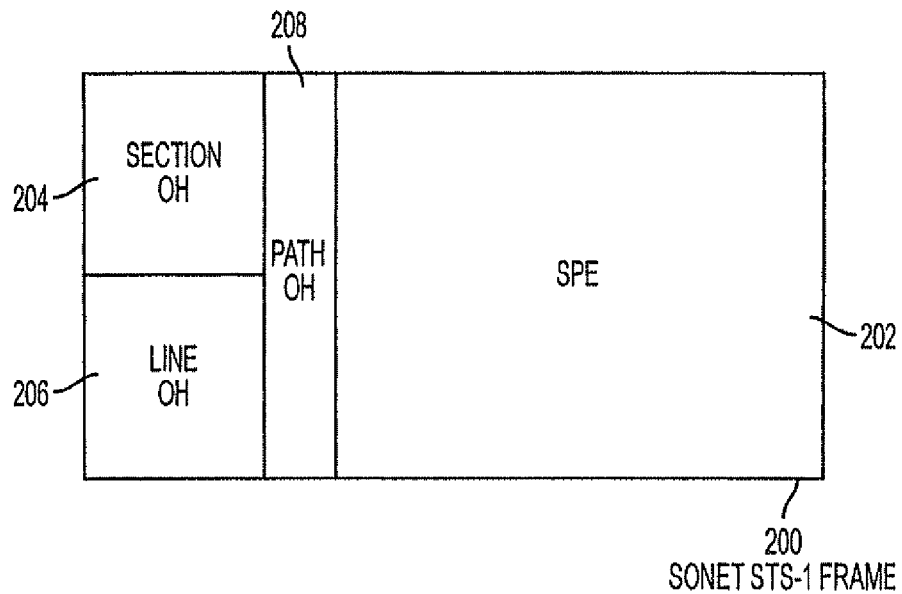
FIG. 11 illustrates the logical format of a SONET STS-1 frame.

FIG. 11 depicts the format of a SONET STS-1 frame 200. Other SONET frame formats may be used to support OC-3, OC-12 and OC-48. The SONET frame 200 includes 9 rows, each row containing 90 Octets (i.e. 90 8-bit bytes). The payload for the SONET frame 200 is contained in the synchronous payload envelope (SPE) 202. The SPE 202 contains 9 bytes that are dedicated to path overhead (OH) 208. The SONET frame 200 also contains section OH 204 and line OH 206. The section OH 204 and line OH 206 are part of the SONET transport overhead. In this context, "overhead" refers to header information that is provided for use by various layers of the computer network.

Figure 10:
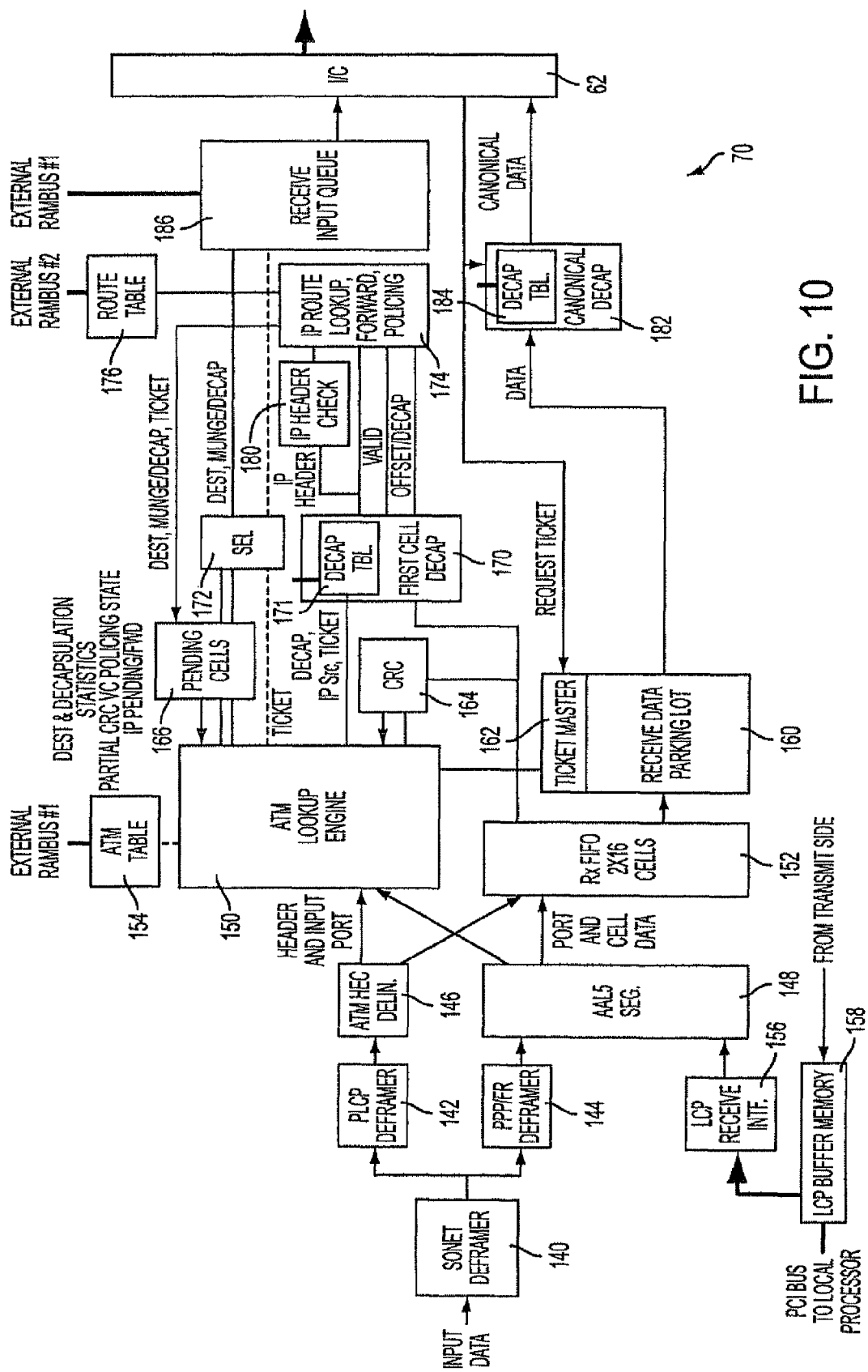
FIG. 10 is a more detailed block diagram of the receive ASIC 70 of FIG. 5.
Figure 12:
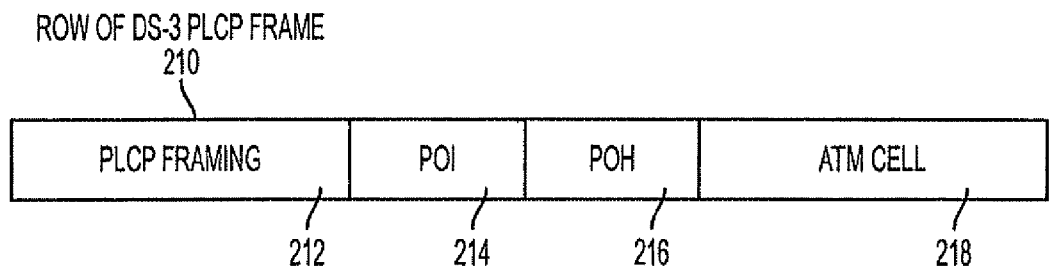
FIG. 12 illustrates the logical format of a row of a DS-3 PLCP frame.

FIG. 10 depicts the components of the receive ASIC 70 in more detail. The receive ASIC 70 includes a SONET deframer 140 that receives the input data. The SONET deframer 140 removes the contents of the SPE 202 from the SONET frame 200. The resulting payload may contain additional frames, as will be described in more detail below. One possibility is that the payload of the SONET frame 200 contains one or more DS-3 PLCP (Physical Layer Convergence Protocol) frames. Such a frame holds a payload that is used in mapping ATM cells onto DS-3 facilities. The frame twelve rows like the row 210 shown in FIG. 12. Each row includes PLCP framing Octets 212 to identify the framing pattern that is utilized. The path overhead indicator (POI) 214 indexes the adjacent path overhead (POH) Octets 216 and identifies the encoding for the POH octet. The ATM cell 218 holds the data content for the frame 210, and the frame may include trailer nibbles (i.e. 4-bits) 220.

Figure 13:
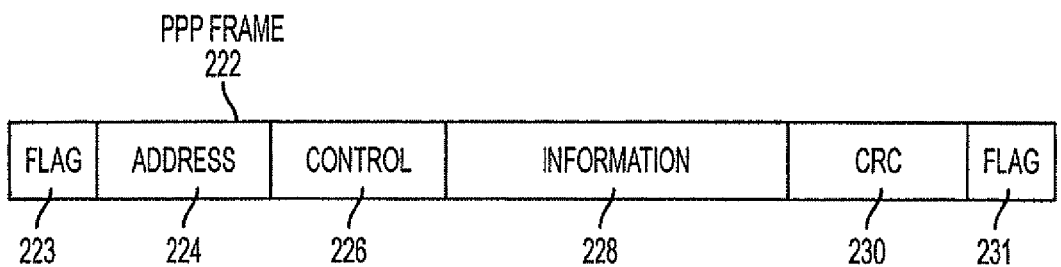
FIG. 13 illustrates the logical format of a PPP frame.

The data may also be encapsulated in a point-to-point protocol (PPP) frame 222, such as shown in FIG. 13. PPP is a layer two protocol that is built on top of a restrictive subset of the standard high level data link control (HDLC) protocol. The PPP frame 222 is delimited by flags 223 and 231. Each PPP frame 222 includes an address 224 and a control field 226 for holding flow control information. The PPP frame 222 contains an information section 228 and a PPP payload. The CRC field 230 identifies the variety of cyclic redundancy check that is used for the frame.

Figure 14:
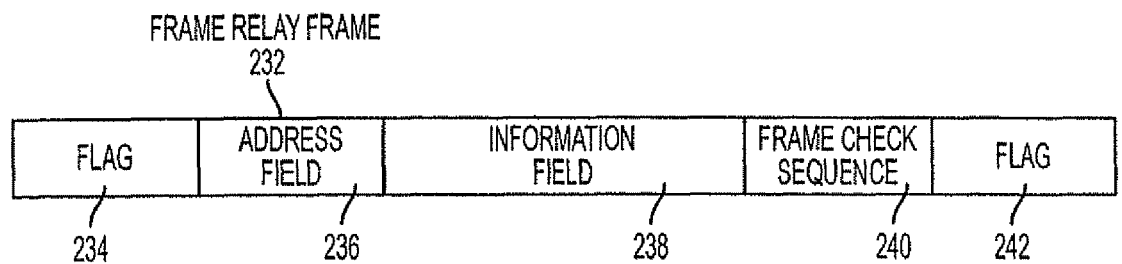
FIG. 14 illustrates the logical format of a frame relay frame.

The data may be encapsulated also in a frame relay (FR) frame 232 (FIG. 14). Each (FR) frame 232 includes a byte of flag information 234 and an address field 236 in the FR frame header. The frame relay frame 232 also contains an information field 238 that holds a payload and a frame check sequence octet 240 that holds information used to check whether the frame is properly received. Lastly, the frame relay frame 232 has a flag octet 242 at the end of it.

Once the ATM cells are located, ATM cell input processing must be performed on each ATM cell (see steps 114 and 116 in FIG. 8). The ATM cell header 303 is sent to the ATM lookup engine 150 along with input port information (Step 260 in FIG. 16). The remaining 48 bytes of the ATM cell are sent to the receive FIFO 152 (Step 262 in FIG. 16). FIG. 17 depicts the format of an ATM cell 290. Each ATM cell is 53 bytes in length with 48 bytes of payload 310 and 5 bytes of header 303. The ATM cell 290 also contains a virtual path identifier (VPI) 294 that identifies virtual path for the ATM cell. The ATM cell 290 includes a virtual channel identifier (VCI) 298 that identifies the virtual channel for the cell. ATM cells use VCIs and VPIs to specify treatment of a cell. A VC (Virtual Channel) is a connection between two communicating ATM entities. A VP (Virtual Path) is a group of VCs that is carried between two points. VPs provide a convenient technique for bundling traffic that is heading for the same destination. In some instances, a switching node need only check for a VPI to relay traffic rather than checking a more complete address.

A payload type 304 is included in the header 303 and includes a three bit field that indicates whether the cell contains user information or contains associated layer management information. A cell loss priority bit 306 allows the specification of explicit loss priority for the cell. The header 303 of the ATM cell 290 also contains a header error control field 308 that is used by the physical layer of the network for bit errors in the cell header.

Figure 16:
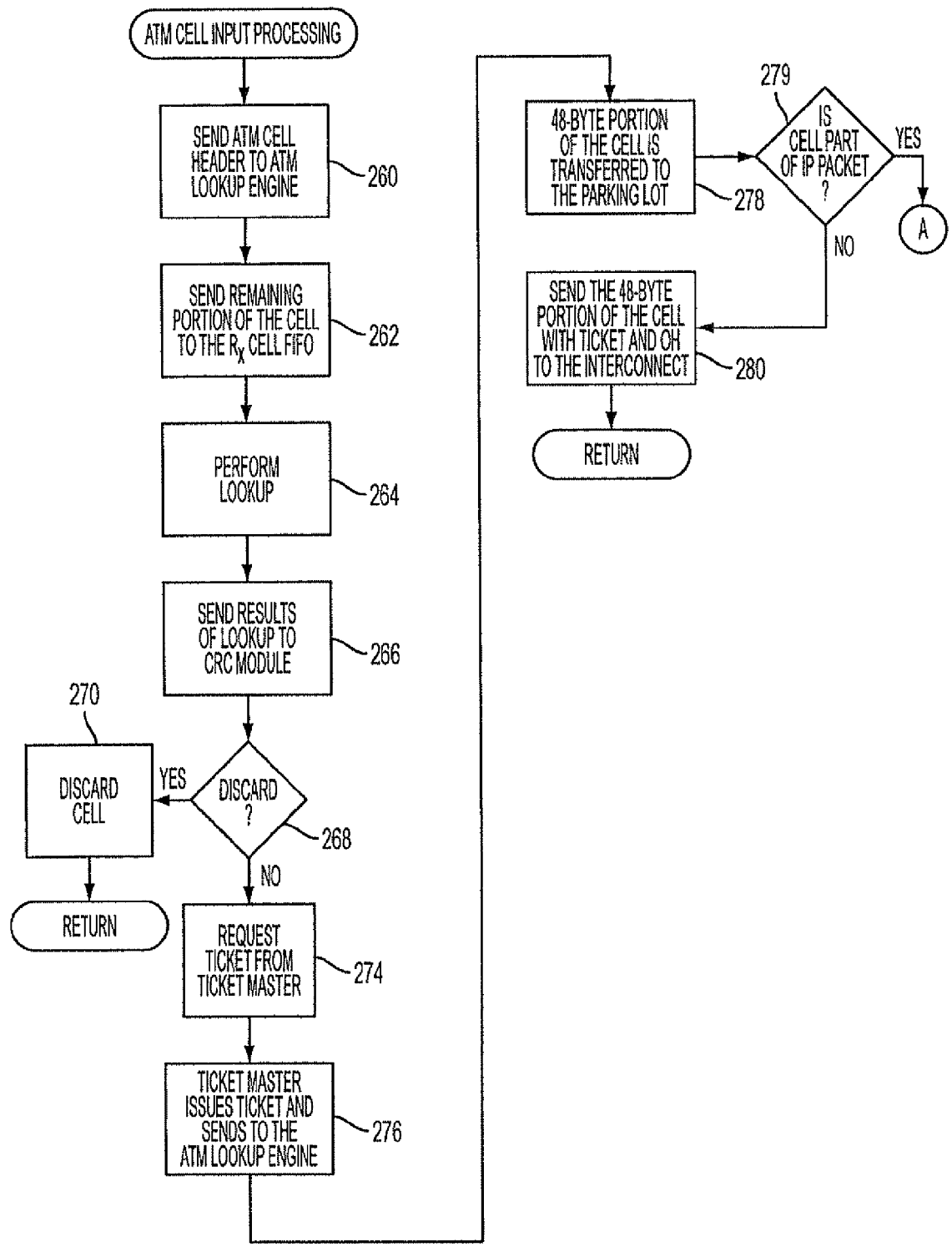
FIG. 16 is a flowchart illustrating the steps that perform during ATM cell input processing.
Figure 17:
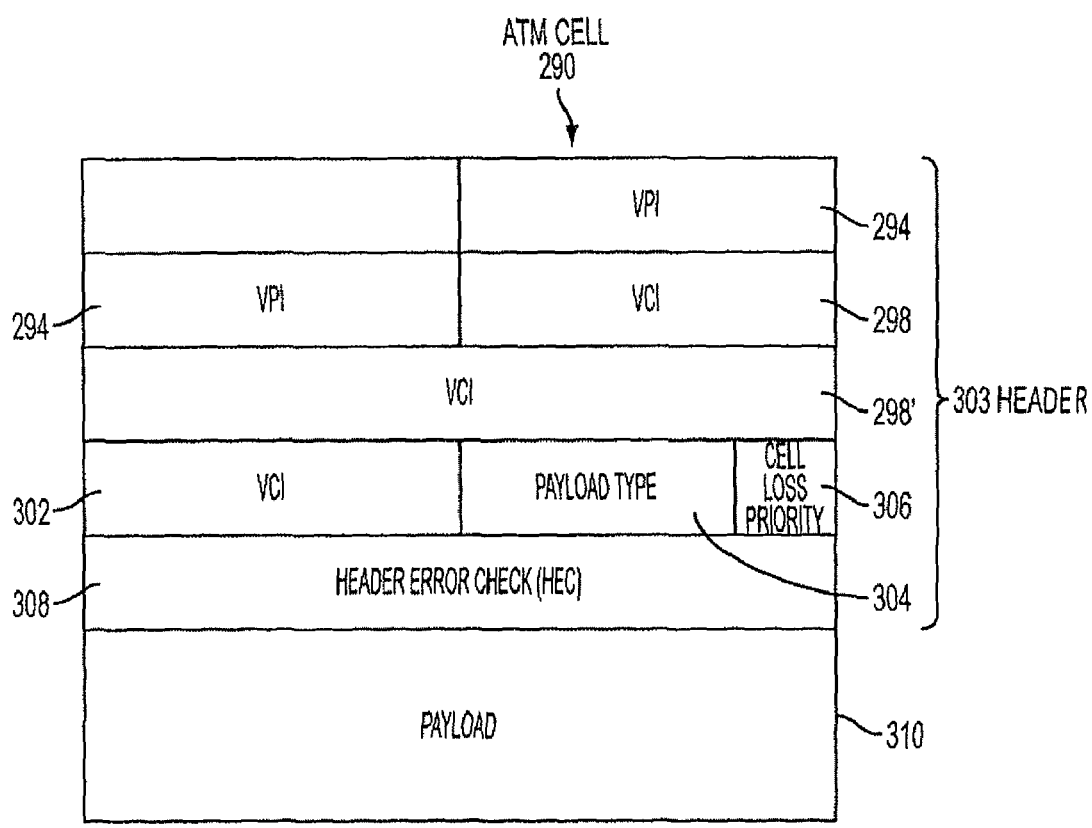
FIG. 17 illustrates the logical format of an ATM cell.

As mentioned above, the ATM cell header 303 is sent to the ATM lookup engine 150 (step 260 in FIG. 16). The payload 310 is sent to the receive FIFO 152 (step 262 in FIG. 16). The ATM lookup engine 115 uses an ATM table 154 to perform a lookup to determine where to direct the ATM cell (step 264 in FIG. 16). The ATM lookup engine plays a role in both the policing (see 126 in FIG. 9) and the lookup function (see 128 in FIG. 9). It should be appreciated that the cell header that is sent to the ATM lookup 150 does not include the HEC field 308. It should also be appreciated that the ATM lookup engine 150 performs a lookup (Step 264 in FIG. 16) as the 48 bytes of data are stored in the receive FIFO 152 (Step 262 in FIG. 16).

The discussion below focuses first on the performance of the ATM lookup Step 264 in FIG. 16) and then briefly discusses policing performed by the ATM lookup engine 150. The policing measures traffic rates, and incoming traffic is validated against traffic contracts using a dual leaky bucket algorithm.

Figure 19:
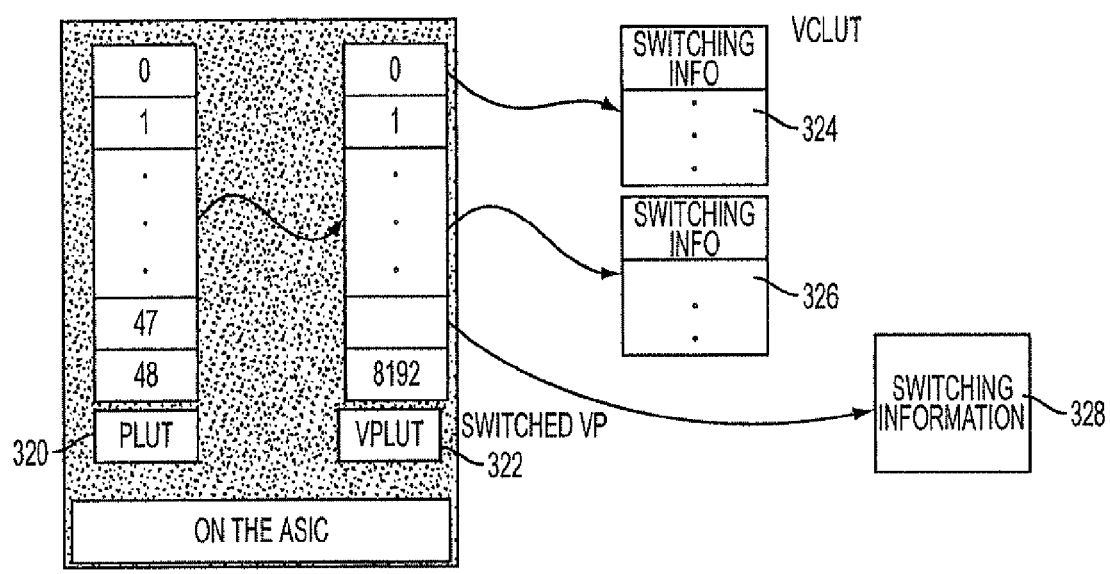
FIG. 19 is a diagram illustrating ATM lookup in the illustrative embodiment.

As shown in FIG. 19 an incoming ATM cell goes through a three stage lookup. The first stage involves accessing the port lookup table (PLUT). The PLUT 320 contains 49 entries, where 48 entries are provided for the 48 different contexts that are possible and a $49^{th}$ entry corresponds to the line card processor (LCP) 72. Each entry in the PLUT 320 points to an entry in the VP lookup table (VPLUT) 322, which constitutes the second stage of the lookup. Each entry in the VPLUT is associated with a particular virtual path. Hence, an entry in the VPLUT point to the virtual path associated with the context for the entry. Each VPLUT entry 322 points to a VC lookup table (VCLUT) which holds information per a particular virtual circuit. Each entry contains a 128 bytes of data. The data identifies the virtual circuit to which the cell is routed or switched or indicates that the circuit terminates on the LCP.

Each VCLUT entry 324, 326, or 328 contains a destination handle and other switching information, including information that is useful in performing policing. A destination handle is a composite data structure that holds useful information regarding where a cell should be directed so that the cell is properly output towards the desired destination. As will be explained in more detail below, the destination handle is used by the transmit ASIC 64 to determine where to send output (i.e. what output port should be utilized). The results of the ATM lookup is generally a destination handle.

As mentioned above, the ATM lookup engine 150 also performs certain policing actions. For ATM cells, separate policers are implemented to monitor peak cell rate (PCR) and sustained cell rate (SCR), according to the traffic contract for the VC or VP. Each policer implements the generic cell rate algorithm (GCRA), that is defined in the UNI 4.0 specification. The PCR leaky bucket algorithm monitors the maximum cell rate within the tolerance permitted by the cell delay variation toleration (CDVT). The SCR leaky bucket algorithm monitors the average cell arrival rate over a period of time within the burst size permitted by the maximum burst size (MBS) and CDVT. SCR applies to VBR and UBR connections and is always less than the PCR. Traffic contracts are defined in accordance with the ATM forms traffic management 4.0 specification. The ATM cells that exceed the traffic contract are subject to policing, which can include marking or dropping the offending cells.

Policing and QOS are described in more detail is copending application entitled "An Interconnect Network For Operation Within A Communication Node" [AGM-006] which is assigned to a common assignee and explicitly incorporated by reference herein.

Figure 18:
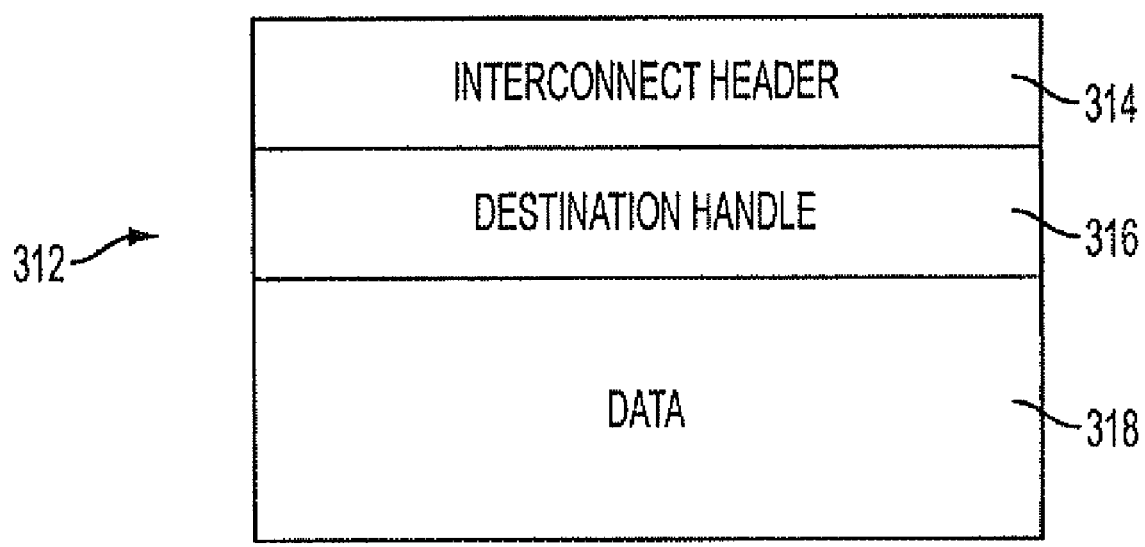
FIG. 18 illustrates the logical format of an internal cell.

The results of the lookup 150 (i.e. destination handle) are sent to the CRC module 152 (step 266 in FIG. 16) The ATM lookup 150 may decide whether to discard, a cell or not as part of policing (see step 268 in FIG. 16). The appropriate cells are then discarded (step 270 in FIG. 16). If the cell is not to be discarded, a ticket is requested from the ticket master 162 (step 274 in FIG. 16). The ticket is a pointer to a location within a receive data parking lot 160 (FIG. 10). The receive data parking lot 160 is a place for storing data while processing is being performed. The ticket may be redeemed to extract the data from the location identified by the ticket. In response to the request, the ticket master 162 issues a ticket and sends the ticket to the ATM lookup engine 150 (step 276 in FIG. 16). The 48 byte portion of the cell containing data is then transferred to the receive data parking lot 160 from the receive FIFO 152. The data is stored at the location identified by the issued ticket (step 278 in FIG. 16). A check is made whether the ATM cell contains a portion of an IP packet (step 279 in FIG. 16). If it does, IP input processing must be performed beginning at step 412 of FIG. 18 (described below). Otherwise, the 48 byte portion of the cell held in the received data parking lot 160 is sent along with the ticket and the destination header to the interconnect 62 (step 280 in FIG. 16). In particular, an internal cell with the format depicted in FIG. 18 is constructed. The internal cell 312 includes data 318 as well as the destination handle 316 for the cell. The interconnect header 314 holds header information that is used by the interconnect 62.

The decapsulation module 182 has a decapsulation table 184 that determines how data extracted from the receive data packet shall be encapsulated into the internal cells (i.e. ecanonical format). For raw ATM cells, the payload of the ATM cells is combined with the header information and the destination handle to create the internal cell that is in sent over the interconnect 62.

Figure 15:
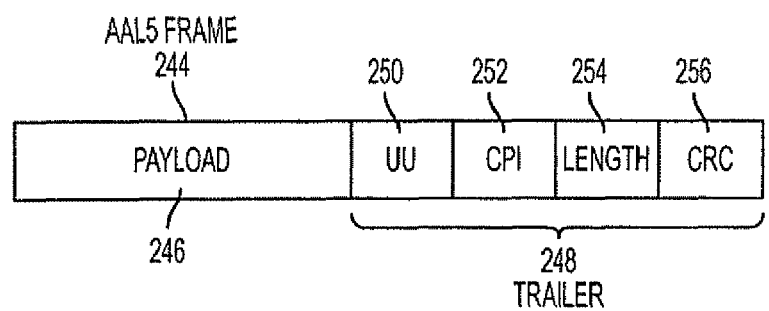
FIG. 15 illustrates the logical format. Of an AAL5 IDU.

In step 118 of FIG. 8, it may be determined that the incoming data is not solely an ATM cell but rather is or is part of an IP packet. For instance, an ATM cell may contain a portion of an IP packet, IP input processing is performed (step 120 in FIG. 8). The IP packet may be encapsulated in a PPP frame or a frame relay frame. As was mentioned above, deframer 144 deframes the PPP frames and the frame relay frames. The IP packet may be encapsulated also in an AAL5 (ATM adaptation layer 5) frame. In other words, the IP packet may be transmitted over ATM. FIG. 15 depicts the format of an AAL5 frame 245. The frame 245 contains a payload 246 as well as a trailer 248. The frame 245 may be of variable length. The trailer 248 contains the user-to-user (UU) field 250, which holds data that is to be transferred transparently between users. A common part indicator (CPI) field 252 aligns the trailer in the total bit stream. The length field 254 indicates the length of the total frame payload 246. A cyclic redundancy check (CRC) field 256 is used for error detection correction in the trailer only. The entire set of data contained in frame 245 is segmented into 48 octet payloads prepended with a 5 octet header to form 53 octet ATM cells.

Figure 20:
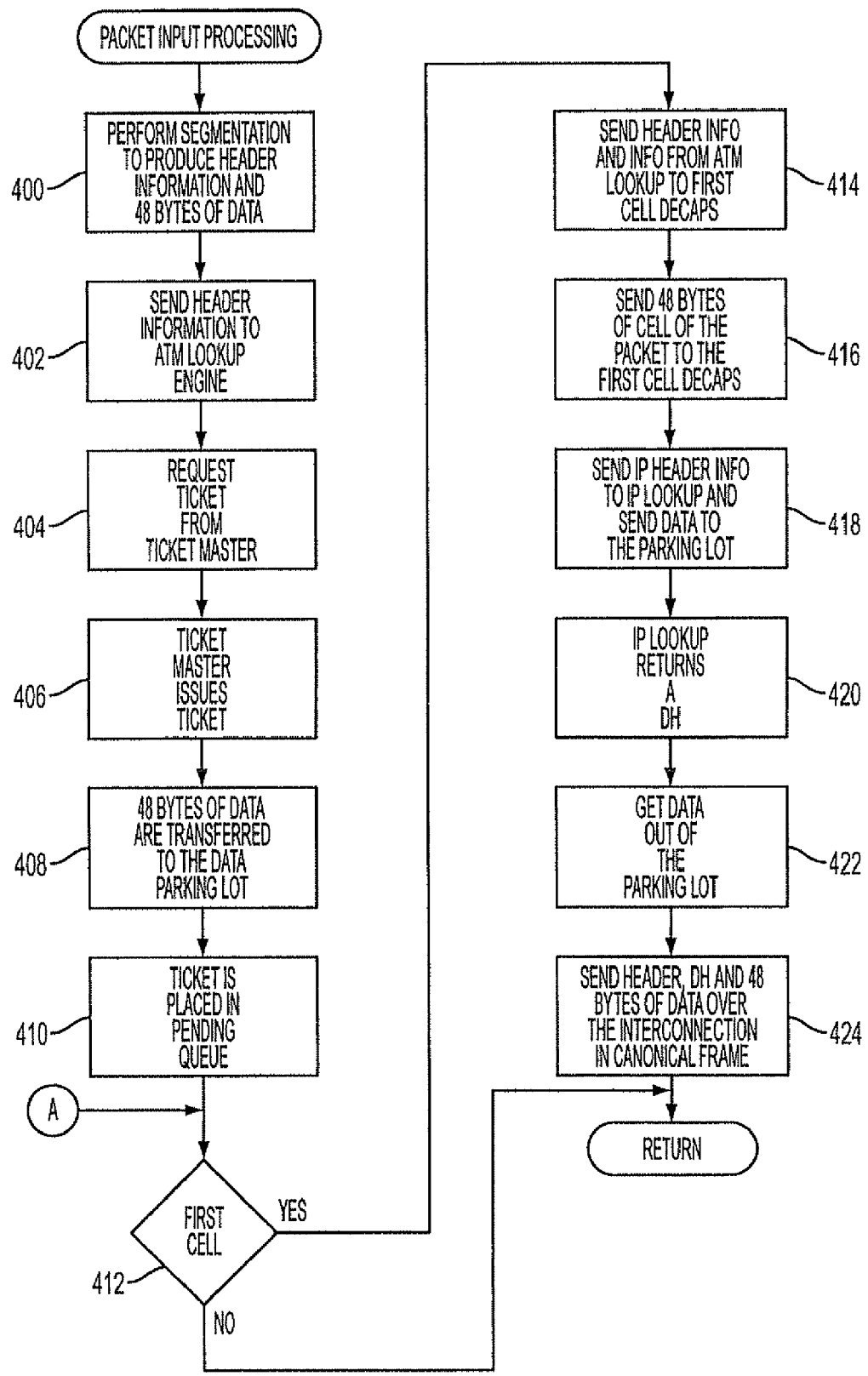
FIG. 20 is a flowchart illustrating the steps performed during IP input processing.
Figure 26:
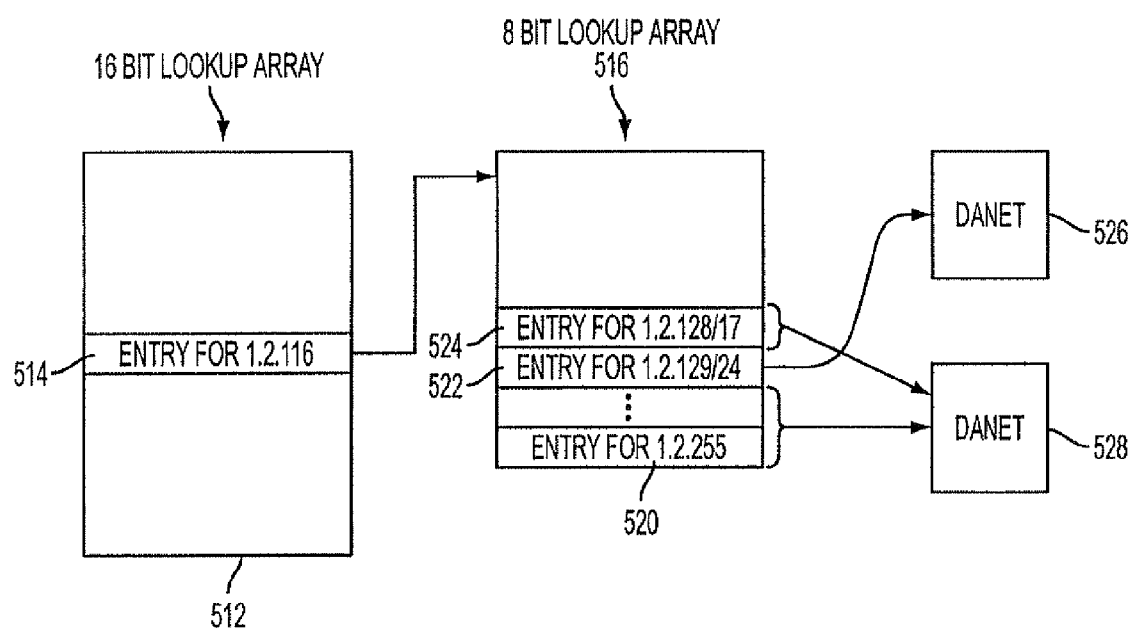
FIG. 26 is a example illustrating the relationship between lookup arrays and DANET structures during IP lookup.

FIG. 20 is a flowchart that illustrates the steps performed during input processing for IP packets. If necessary, the IP packet is divided into pseudo-ATM cells by the AAL5 segmenter 148 (step 400 in FIG. 20). In the case where the input in packet over ATM, the IP packet may be held in one ATM cells or may be held in multiple ATM cells. The header information from each of the pseudo-ATM cells is sent to the ATM lookup engine 150 (step 402 in FIG. 20). A ticket is requested from the ticket master 162 (step 404 in FIG. 20). The ticket master issues a ticket in response to the request (step 406 in FIG. 26). The 48 bytes of data from the cell are then transferred to the parking lot (step 408 in FIG. 20). The ATM lookup engine 150 recognizes the cell as containing IP packet data and places the ticket for the cell in the pending cells queue 166 (step 410 in FIG. 20). If necessary, the pending cells queue 166 accumulates the cells that constitute a single packet so that all of the cells for a packet are transmitted to the same destination over the interconnect 62.

In order to understand how processing proceeds, it is helpful to consider the case where the PPP frame contains an IP packet. In such an instance, the receive ASIC 70 shreds the IP packet in the PPP frame into pseudo-ATM cells and sends the headers to the ATM lookup engine 150 and the data 48 data bytes to the receive FIFO 152. The PPP frame is aliased into ATM cells so that ATM lookup engine 150 is able to process them. Specifically, traffic coming over a PPP context has a VPI/VCI with a preconfigured value of 0/1. This value is inserted into the headers of the internal cells generated by the AAL5 segmented 148. The VPI/VCI value of 0/1 for the PPP context is configured as a circuit that is routed. For frame relay frames, the VPI/VCI is set according to the incoming DLCI value plus one. When processing incoming header data, the ATM lookup engine 150 returns either a destination handle or a placeholder destination handle. The placeholder destination handles are an indication that the incoming header is for an IP packet and requires further IP processing. The presence of the placeholder destination handle output causes the header information to be placed in the pending cells queue 166.

The ATM lookup 150 determines whether the cell is for the first cell of an IP packet (step 412 in FIG. 20). If the cell is not the first, no further input processing is required. If, however, it is determined that the cell is first cell for an IP packet, the IP header information is located in the payload of the first cell which is available to the first cell decapsulation module 170 (step 414 in FIG. 20). The 48 bytes of data for the cell are sent from the receive FIFO space 152 to the first cell decapsulation module 170 as well (step 416 in FIG. 20). The first cell decapsulation module 170 decapsulates the information contained in the first cell is payload to send appropriate information to the IP lookup module 174 and the data is sent to the parking lot (step 418 in FIG. 20). The first cell decapsulation module 120 uses a decapsulation table 171 to identify how to decapsulate the cell. The IP lookup module 174 performs both forwarding lookup 132 (FIG. 9) and policing 130 for IP packets. The data is retrieved from the parking lot (step 422 in FIG. 24). The IP lookup module 174 returns a destination handle that identifies where to send the internal cell that will be sent over the interconnect 62 (step 420 in FIG. 20). The canonical frame is sent over the interconnect (step 424 in FIG. 20). IP packets are gathered into canonical frames that have the format of an AAL5 frame other than the trailer bytes being rearranged. The aggregation of the multiple byte chunks into the canonical frame enhances the efficiency of transmission across the interconnect 62.

Figure 21:
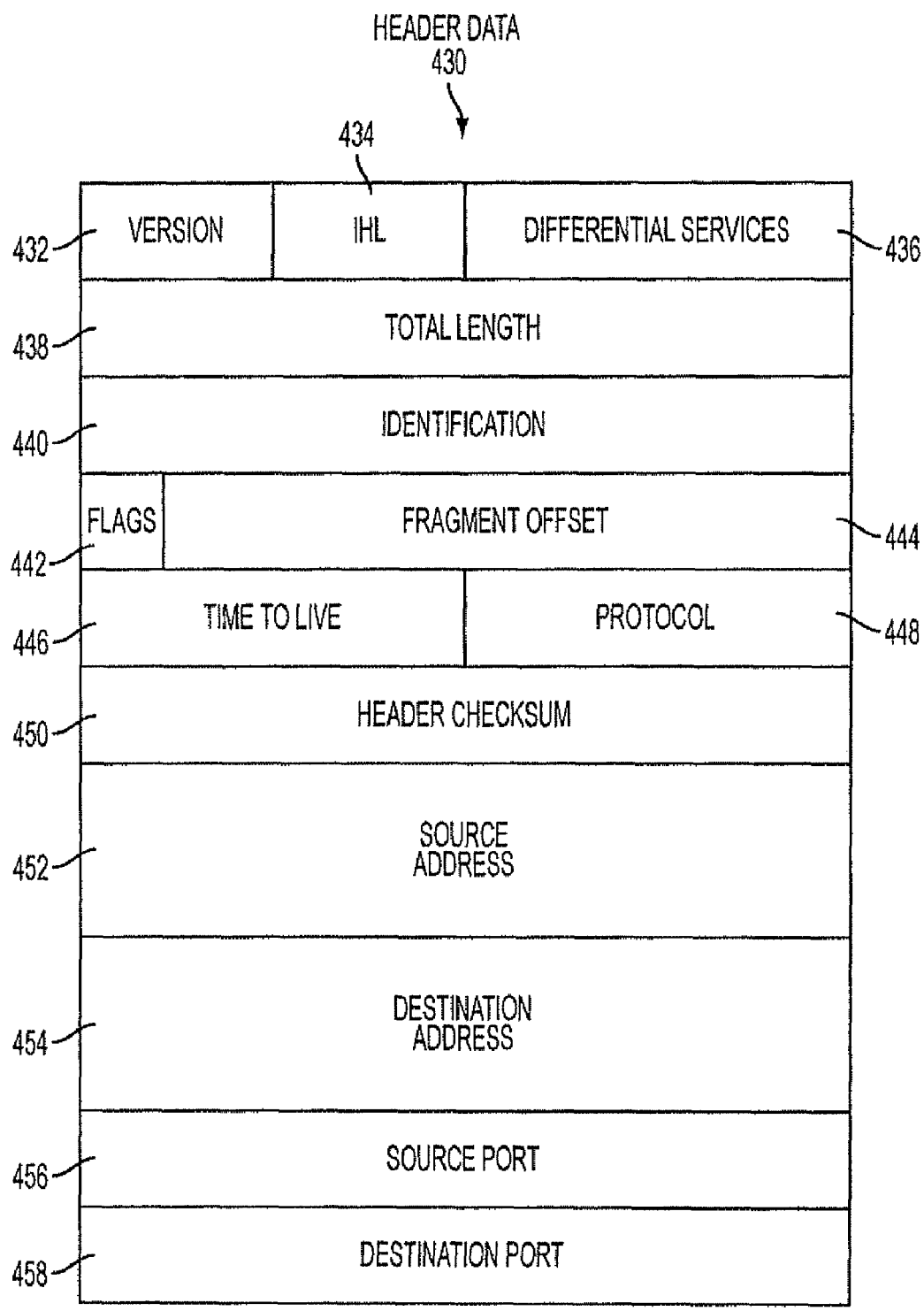
FIG. 21 illustrates the logical format of header data that is used during IP lookup.

FIG. 21 depicts the format of the IP header data 430 that is used by the IP lookup module 174. All of the fields in the header data 430, other than fields 456 and 458, (FIG. 21) are copied from the IP header of the associated IP packet. Fields 456 and 458 are copied from a transport header. The header data 430 includes a version field 432 that holds information regarding the version of the IP protocol being used. For version 4 IP packets, this field 432 holds a value of 4. The Internet header length (IHO) field 434 identifies the length of the header from the IP packet in multiples of 4 octets. The differential services field 436 holds a value that identifies a particular handling or treatment for the packet. The total length field 438 holds information regarding the total length of the packet before any fragmentation occurs. The identification field 440 provides identification value for the packet that may be used if the packet is later fragmented to associate the fragments with the original packet.

The header data 430 includes flags 170, including a DF flag and a MF flag. The DF ("don't fragment") flag indicates whether a datagram that is carried at least in part by the packet is to be fragmented. The MF ("more fragment") flag identifies whether there are more fragments or whether the packet holds the last fragment of the datagram. The fragment offset field 444 holds an offset value that identifies the offset in which the fragment belongs to the reassembled packet. The time to live field 446 identifies the time period for which the packet is valid and after which the packet should be discarded. The protocol field 448 holds a value that allows the network layer of the destination end node to know which protocol that is running at the end node should receive the packet. A header checksum field 450 is provided. A source address field 452 and a destination address field 454 are provided to hold a source address from which the packet originated and a destination for which the packet is to be forwarded respectively. The source port field 456 identifies a source port and destination port field 458 identifies a destination port for the packet.

Figure 22:
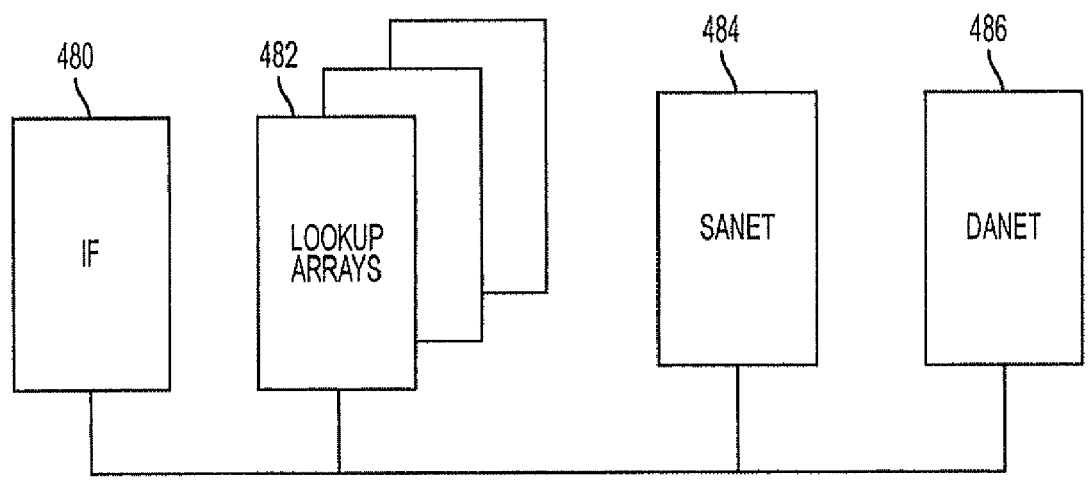
FIG. 22 illustrates data structures and tables that are employed during IP lookup.

The IP lookup module 174 uses a number of tables (see Route Table 176 in FIG. 10) and other structures in performing IP lookup. FIG. 22 depicts a number of the more prominent tables and structures that are utilized. An interface (IF) structure 480 is provided to identify each interface (i.e. context) from which data is received. The interface structure contains an initial lookup element that is utilized when forwarding lookup is to be initiated. This initial lookup element is an array lookup element that contains an instruction to be executed at the beginning of forwarding lookup for an IP packet (as will be described in more detail below).

Figure 23:
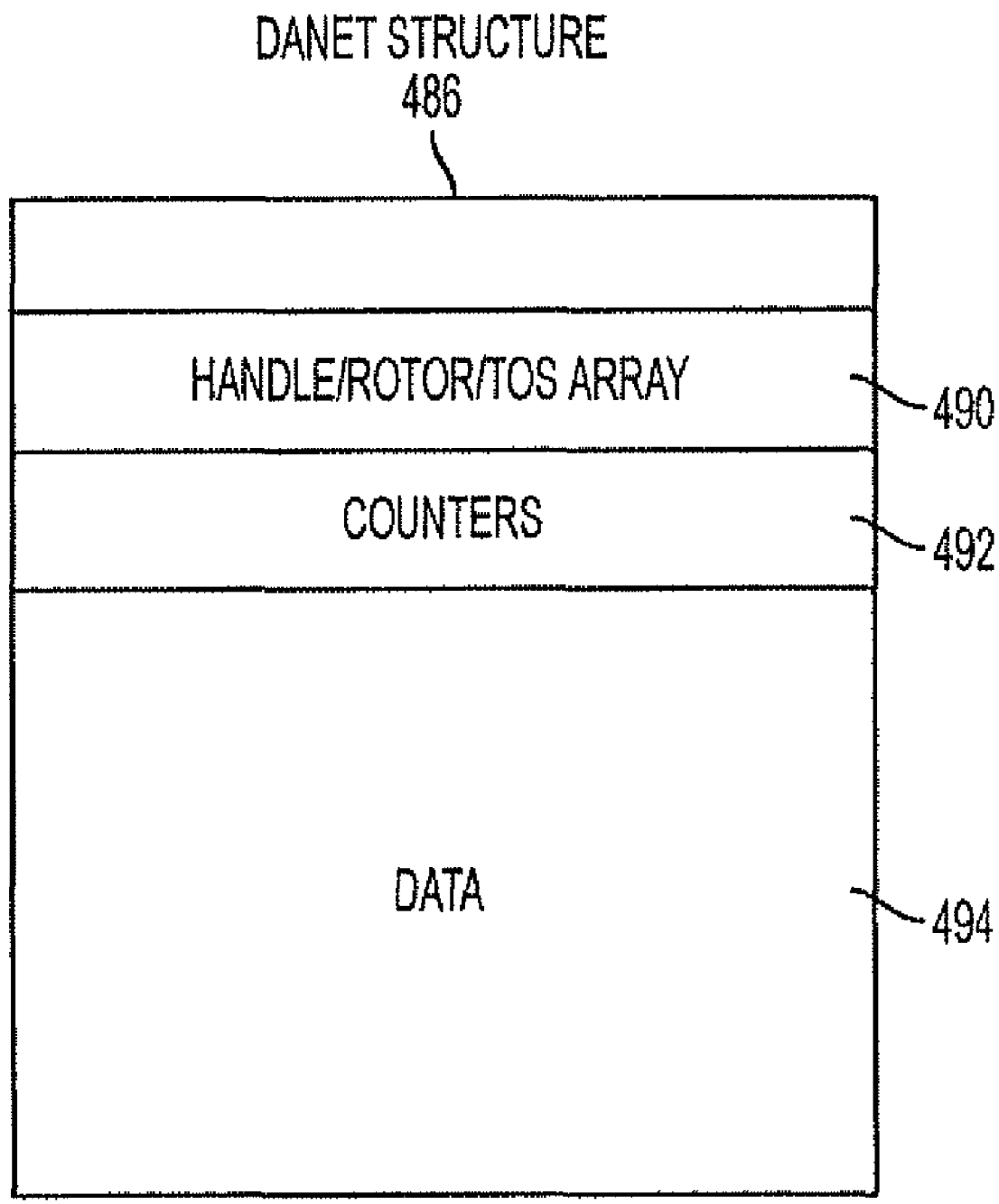
FIG. 23 illustrates a logical format of a DANET structure.

The IP lookup module 174 uses lookup arrays 482 containing lookup elements. The IP lookup module 174 may also use a SANET 484 or DANET 486. The SANET is a data structure that holds a number of structures for respective source addresses that are being exploited for quality of service (QOS) processing and type of service (TOS) processing. DANET 486 holds DANET structures that contain information regarding destination addresses that identifies the next hop for IP packets. FIG. 23 shows the basic format of a DANET structure 486. The DANET structure 486 holds a destination handle, a pointer to a rotor or a pointer to a TOS array in field 490. A rotor is a data structure that contains a set of destination handles. A rotor may be used to aggregate multiple lower speed links into a virtual higher speed link. A TOS array is also an array of handles but it is indexed by a TOS parameter value. The TOS array allows the destination handled to vary with TOS. The DANET structure 486 also contains counters 492 for holders statistical data and may also contain additional purposes as well as other data.

Figure 24:
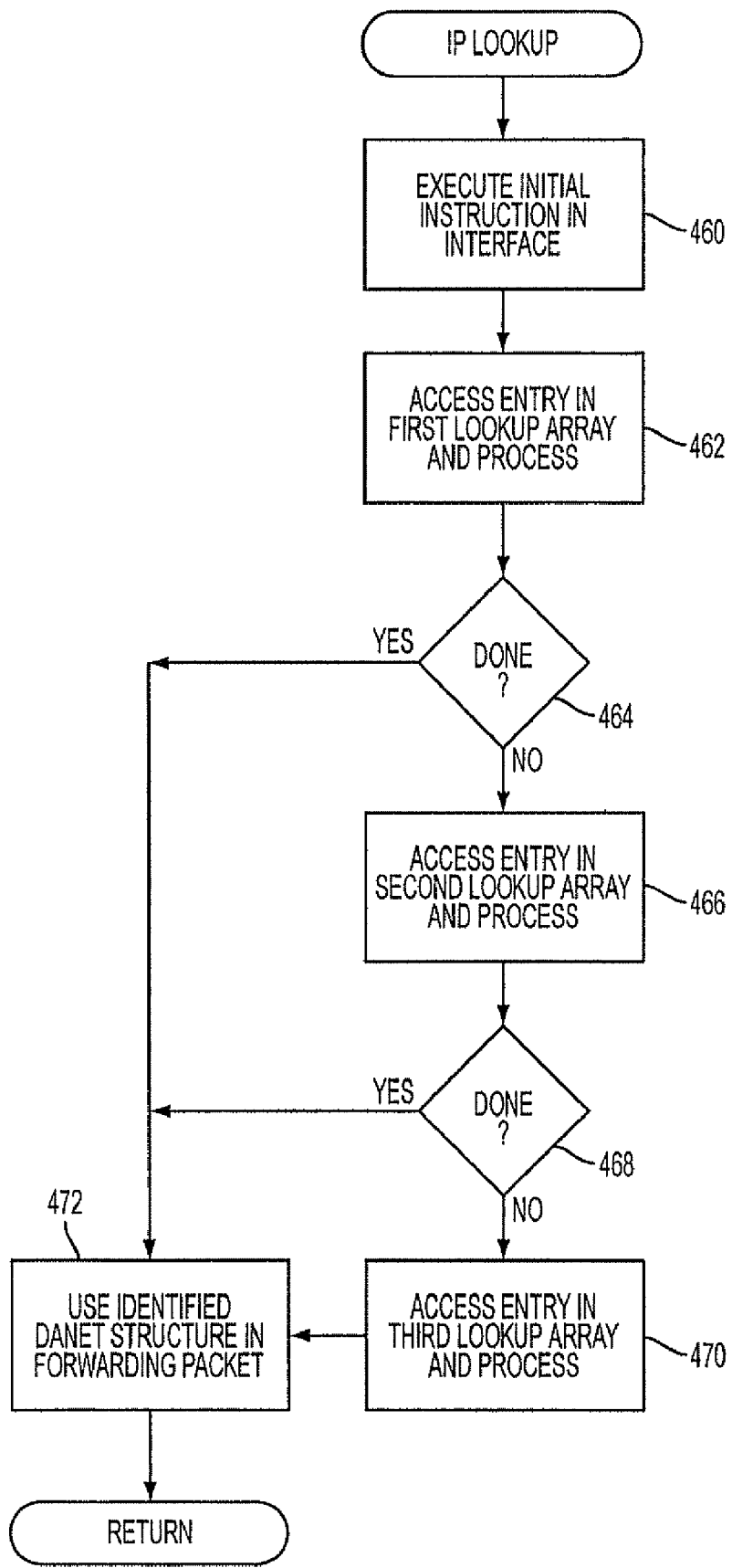
FIG. 24 is a flowchart illustrating steps performed during IP lookup.
Figure 25:
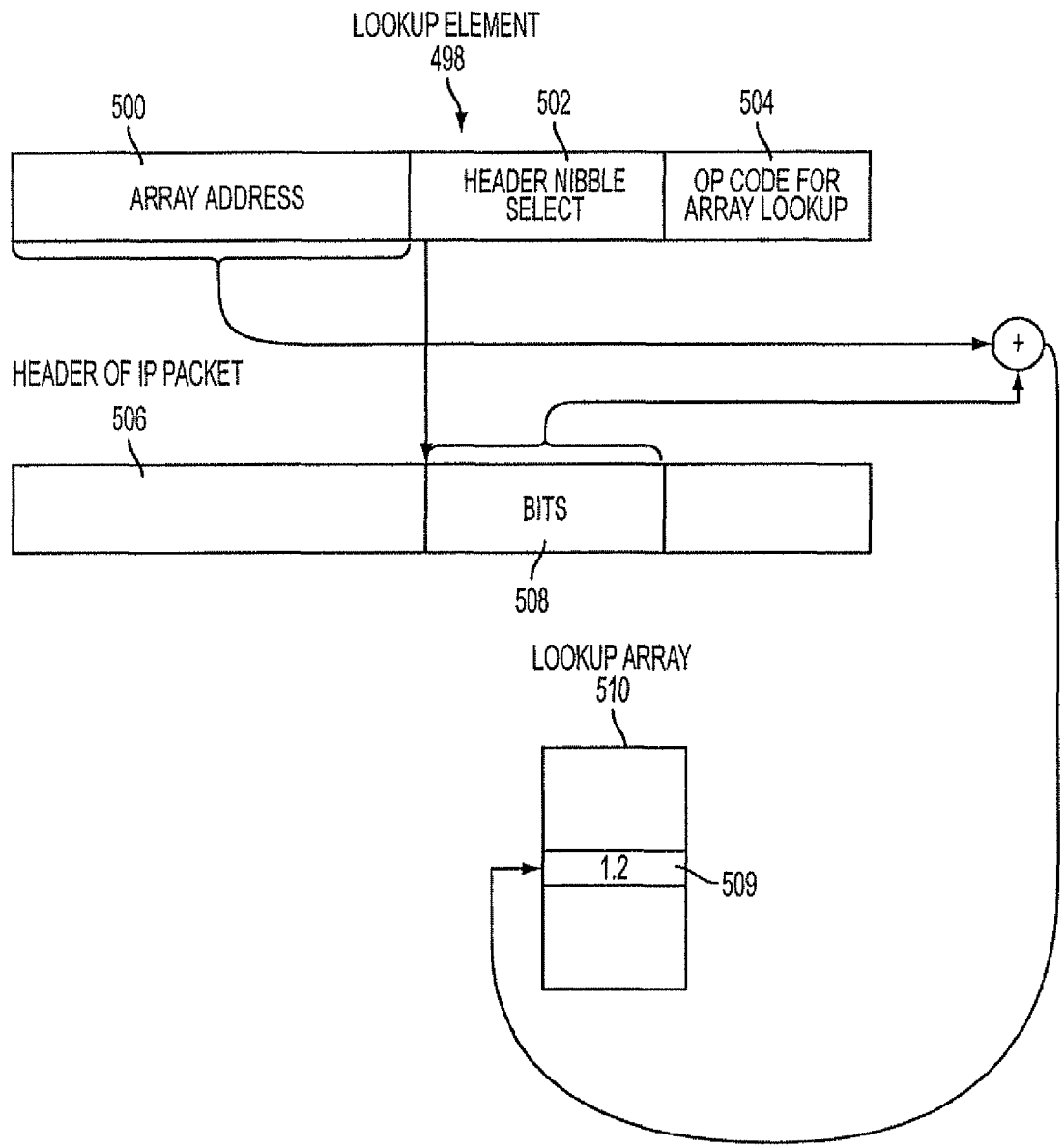
FIG. 25 is a diagram illustrating the indexing of a lookup array during IP lookup.

FIG. 24 provides a flow chart of the steps that are performed during an IP lookup for a unicast IP packet. The IP lookup determines how to send the IP packet to the next hop toward the destination (i.e. ultimately, it determines what output port to use). The IP lookup module 174 knows the interface on which the IP packet arrived. The interface structure for the associated interface is accessed and the IP lookup module 174 processes the initial lookup element contained in the interface structure (step 460 in FIG. 24). As shown in FIG. 25, the interface element contains a lookup element 498. The lookup element 498 contains an array address 500 and an opcode for array lookup 504. The lookup element 498 also contains a header nibble select 502 that identifies what 4 bit nibble within the header may be utilized to generate an index to an array lookup element in lookup array 510. The array address combined with the nibble that is selected by the header nibble select 502 is used to access a lookup element 509 in lookup array 510. The bits 508 contained within the header of the IP packet 506 are combined to produce an index for accessing lookup element 509.

The route table 176 contains multiple lookup tables. In particular, a tree of lookup arrays is provided. The first level of the tree is a single lookup array that is indexed by the first two bytes of the destination IP address for an IP packet. The second level of the tree contains lookup arrays indexed by the third bytes of the destination IP address. The third level of the tree contains lookup arrays that are index by the final byte of the destination IP address. By using this tree structure, the illustrative embodiment is able to decrease the number of memory access required and to increase the speed with which IP lookup occurs.

After the instruction has been accessed in the interface structure (see step 460 in FIG. 24), an entry is accessed in the first lookup array and processed (step 462 in FIG. 24). The instruction tells the IP lookup module 174 what to do next. For example, the instruction may instruct the IP lookup module 174 to access an element in a second lookup table. Alternatively, the instruction may direct the IP lookup module 174 to use a destination handle contained within a particular DANET structure. If the entry in the first lookup array does not complete (i.e. identify a DANET structure to use) the process (see step 464 in FIG. 24), an entry is accessed in the second lookup array and processed (step 466 in FIG. 24). If the processing of this entry in the second lookup array does not complete the lookup (see step 468 in FIG. 24), an entry in the third lookup array is accessed and processed (step 470 in FIG. 24). If the instructions in the lookup arrays direct the use of an identified DANET structure in forwarding the packet, that structure is utilized (step 472 in FIG. 24).

Figure 28:
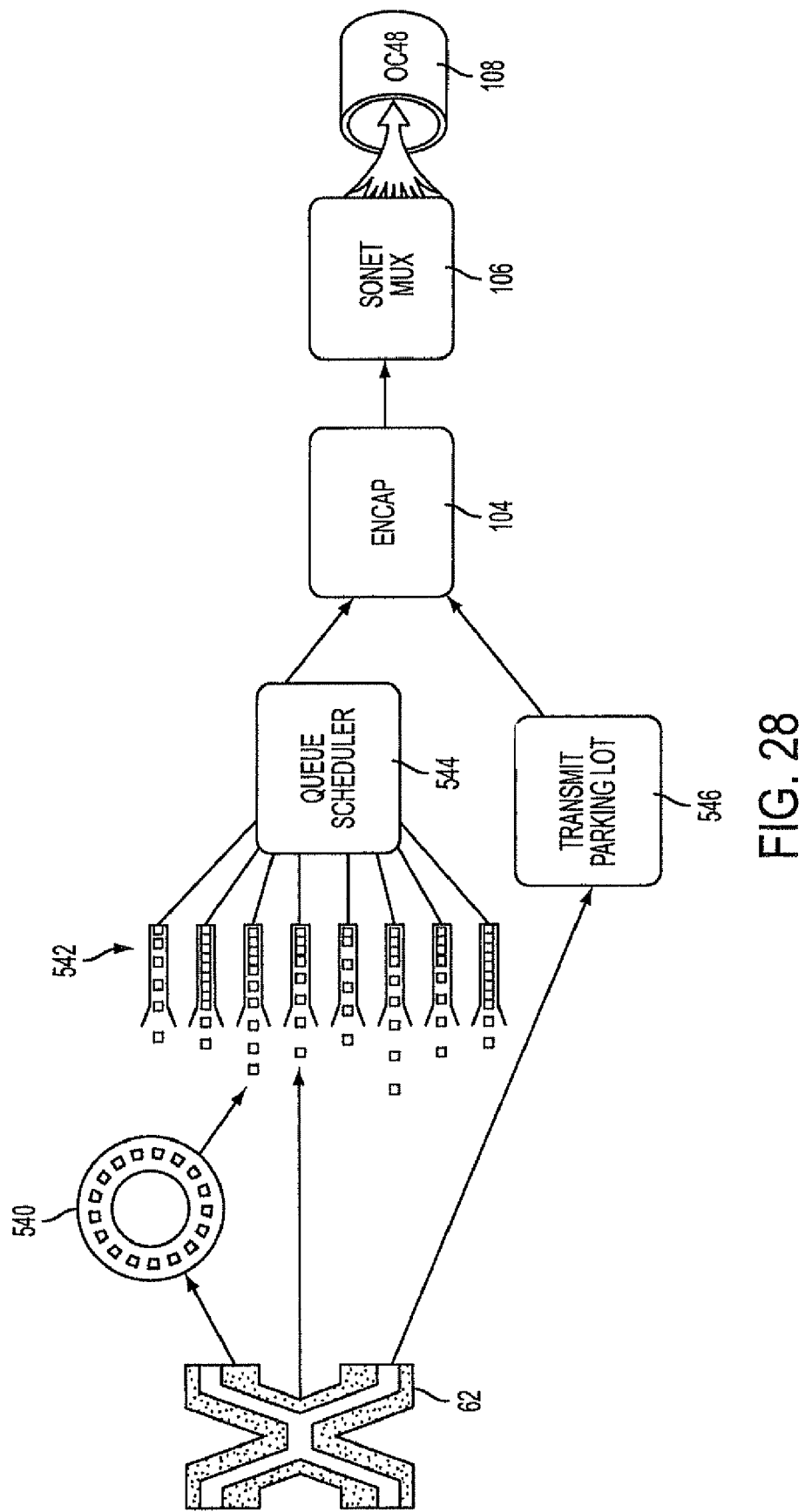
FIG. 28 is a functional diagram illustrating functional stages that are performed during output processing.

FIG. 28 depicts an example that illustrates how the lookup arrays and DANET structures are used in conjunction. In the example depicted in FIG. 26, the 16-bit lookup array 512 contains an entry 514 for the prefix 1.2/16. This entry 514 advises the use of the 8-bit lookup array 516. The next bit in the destination address is then used locate an entry, such as entry 522 or entry 524. Entry 522 is for the IP destination address 1.2.129/24. The DANET structure 526 is used in such an instance. For the IP destination address of 1.2.128/17 the DANET structure 528 is used.

IP lookup is described in more detail in copending application entitled, "Network Packet Forwarding Lookup With A Reduced Number Of Memory Accesses," application Ser. No. 09/237,128, filed on Jan. 25, 1999, which is assigned to a common assignee with the present application and which is explicitly incorporated by reference herein.

Policing of IP packets also occurs in the IP lookup module 174 (see 130 in FIG. 9). IP packets are classified into three bands: green, amber or red. Green implies that the traffic is within traffic limits. Amber implies that the traffic is over the traffic limits but under a predefined burst rate, and red implies that the traffic is over the burst rate. The policing may be used to mark the TOS bit in the IP header. In addition, the policer in the IP lookup module 174 generates a profile indicator value in a range of one to four that used in input to a random early discard (red) algorithm on the transmit ASIC 64. Each flow has an associated traffic profile that sets limits on how much traffic the flow is allowed to generate. The flow limit is enforced by a token bucket algorithm that allow brief bursts above the flow limit. The token bucket assigns incoming traffic to the appropriate band. Thus, the IP lookup engine performs both the policing function 130 (FIG. 9) and IP forwarding function (132 in FIG. 9).

Figure 27:
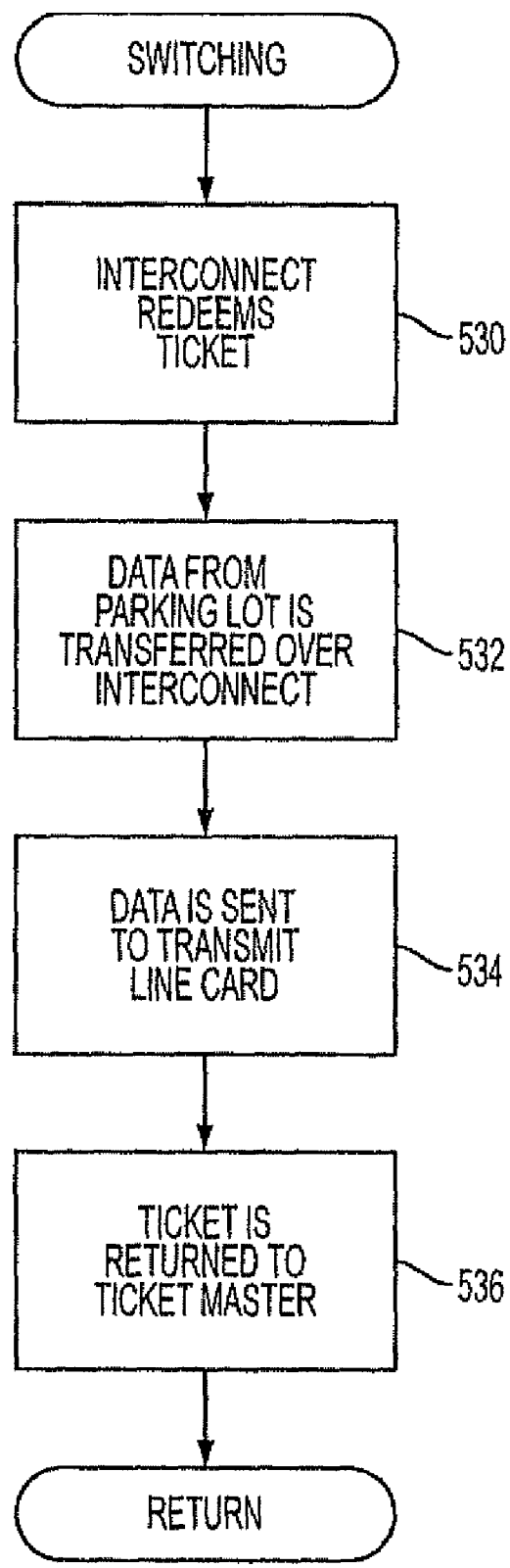
FIG. 27 is a flowchart illustrating the steps that are performed during the switching stage.

FIG. 27 is a flow chart that depicts the steps performed by the interconnect as a part of the interconnect stage 82 (FIG. 6). The interconnect redeems a ticket to obtain data from the received data parking lot 160 (step 530 in FIG. 27). The data from the parking lot is then transferred over the interconnect 62 (step 532 in FIG. 27). The data is sent to the appropriate transmit line card (step 534 in FIG. 27). The ticket is then returned to the ticket master 162 on the receive ASIC 70 (step 536 in FIG. 27). The interconnect is described in more detail in copending application entitled, "Interconnect Network For Operation Within A Communication Node," which is assigned to a common assignee with the present application and explicitly incorporated by reference herein.

The interconnect 62 delivers the internal cells to the transmit ASIC 64. The transmit ASIC is responsible for performing output processing (see 84 in FIG. 6) so the appropriate output data stream is output over the appropriate port. This can be seen in FIG. 28, output traffic received from the interconnect 62 is buffered in the transmit parking lot 546 until the cell or packet is transmitted to it. If an internal cell is received as part of an IP packet, output processing is normally deferred until all of the internal cells for that packet have been received.

Figure 29:
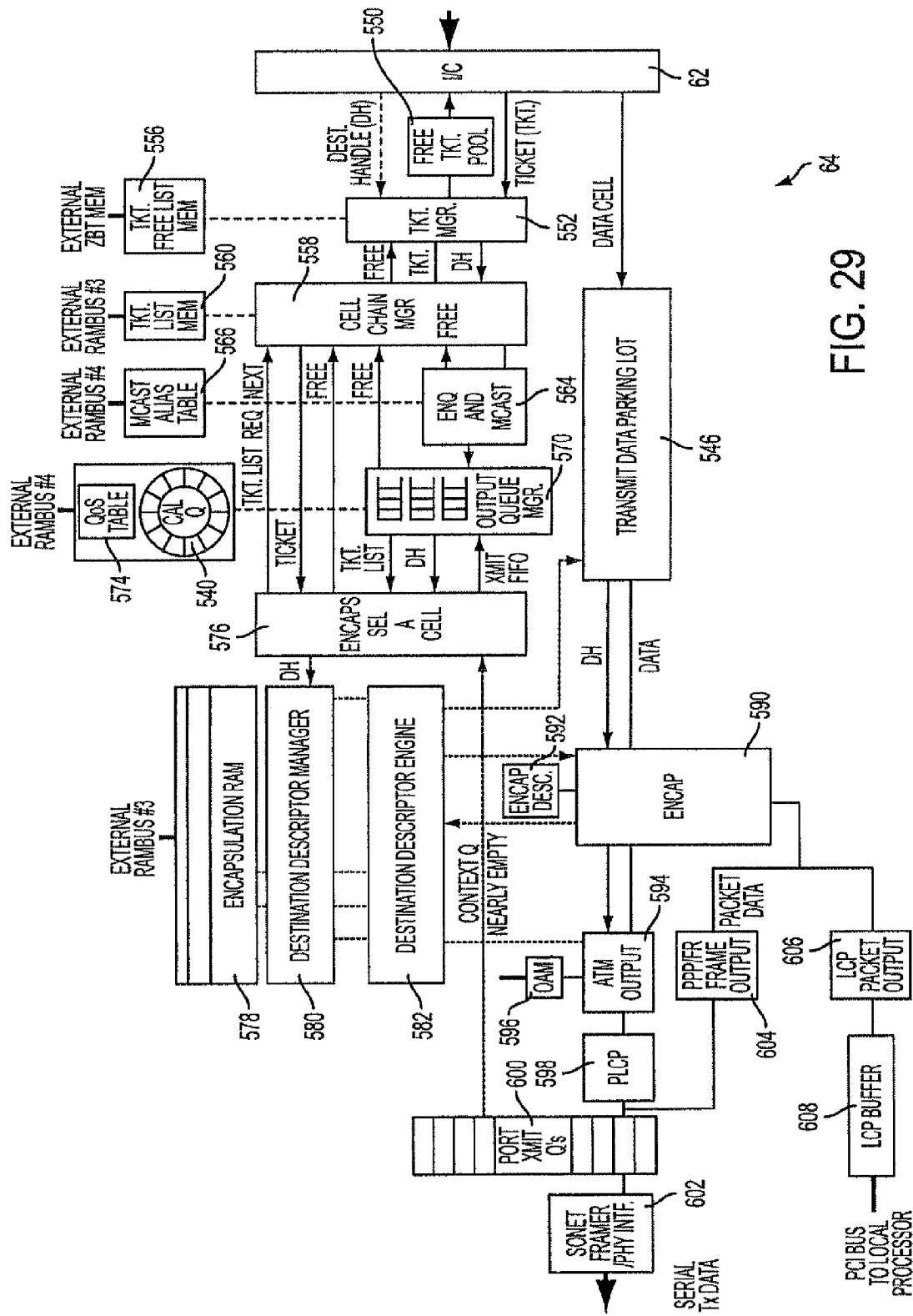
FIG. 29 is a more detailed diagram of the transmit ASIC 64 FIG. 5.

FIG. 29 depicts the transmit ASIC 64 in more detail. The 64 byte internal cell is received from the interconnect 62. The interconnect header 314 (FIG. 18) is removed, and the data portion 318 of the internal cell is sent to the transmit data parking lot 546. The transmit data parking lot 546 may be implemented as an SDRAM. Those skilled in the art will appreciate that the transmit data parking lot 546 may be implemented alternatively with a number of other types of memory devices.

A ticket manager 552 manages the distribution of tickets. The ticket manager 552 has access to a ticket free list memory 556 and accesses the memory 556 to provide the interconnect 62 a free ticket pool 550 of locations in the transmit data parking lot 546 that are available for use. The interconnect 62 chooses one of the free tickets and presents the ticket to the ticket manager 552. The interconnect 62 also asks for the data to be stored at the location identified by the ticket in the transmit data parking lot 546.

The ticket manager 552 is provided with the destination handle (DH) for the internal cell and passes the DH to the cell chain manager 558. The cell chain manager 558 accumulates packets of cell chains. In the customary case, the cell chain manager 558 makes sure that all components (i.e. chunks of data) of an IP packet are available before the IP packet is transmitted. There may also be a cut-through case wherein this restriction is relaxed.

The output queue manager provides scheduling for implementing QOS options. It manages various output queues which will be described in more detail below. The output queue manager 570 cooperates with a QOS table 574 and a calendar queue 572.

The output data stream need not be a unicast data stream but rather may be a multicast data stream such that the same data stream is sent to multiple destinations. Component 564 in FIG. 29 is responsible for both in enqueueing cells in the transmit queues and performing steps necessary to support multicast output. Multicast packets or cells are identified by component 564 and given a multicast identifier that corresponds to an ATM or IP multicast group. The packets or cells to be sent are replicated by component 564 to generate as many copies as there are destinations specified in a multicast alias table 566. The replicated data is input into the appropriate queues.

Figure 30:
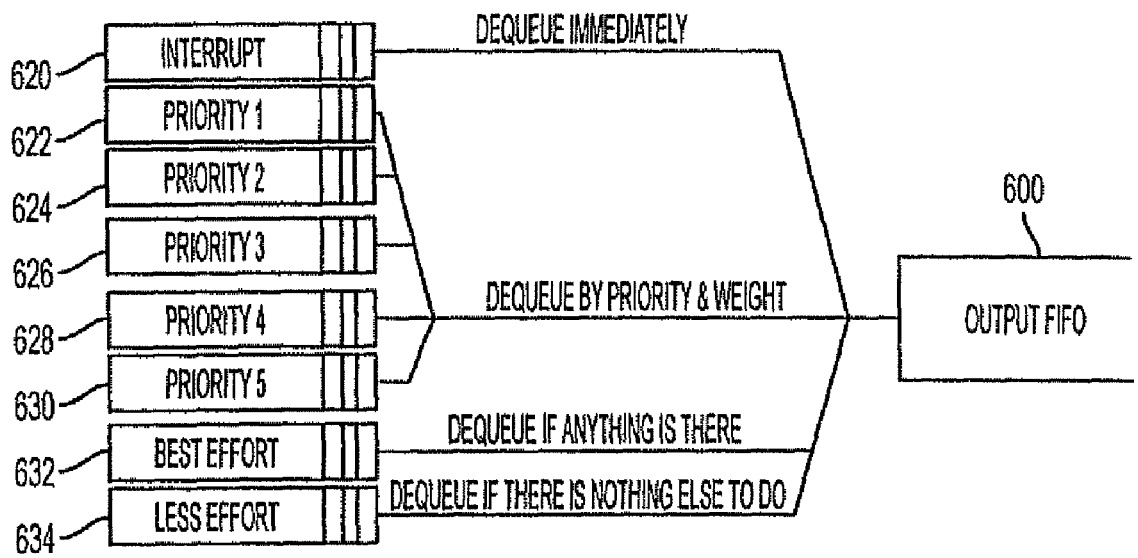
FIG. 30 illustrates the transmit queues employed on the transmit ASIC 64.

For each context there are eight queues, like those depicted in FIG. 30. A destination handle for a cell specifies in which queue to put the cell. The interrupt queues 620 is the highest priority queue and is dequeued immediately. The interrupt queue 620 is used for extremely urgent data that has to be transmitted ahead of other information. Priority queues 622, 624, 626, 628 and 630 are for a different priorities of data. These priority queues 622, 624, 626, 628 and 630 are serviced in accordance with a weighted round robin scheme where the data in the higher priority queues (e.g. priority one queue 622) is serviced prior to the servicing of lower priority queues (e.g. priority five queue 630). The best effort queue 632 is used for all traffic that has no guarantees or assurances of delivery. The less effort queue 634 is used for data that's tagged as being in the violation of a traffic specification and would be dropped if there was not any available bandwidth. In general, data on the less effort queue 634 is not expected to be transmitted but can be if there is available bandwidth.

A calendar queue 540 is provided to shape or rate limit traffic. Data is regulated via the calendar queue 540 to be placed into the queues 620, 622, 624, 626, 628, 630, 632 and 634. If a cell or packet is to be shaped (i.e. output to QOS processing), then the cell or packet is passed through the calendar queue 540. As the calendar queue delays outgoing traffic beyond the configurable threshold, the traffic is dropped. After the shaping is complete, the cell or packet in the input queue is transmitted to the specified output queue.

Figure 31:
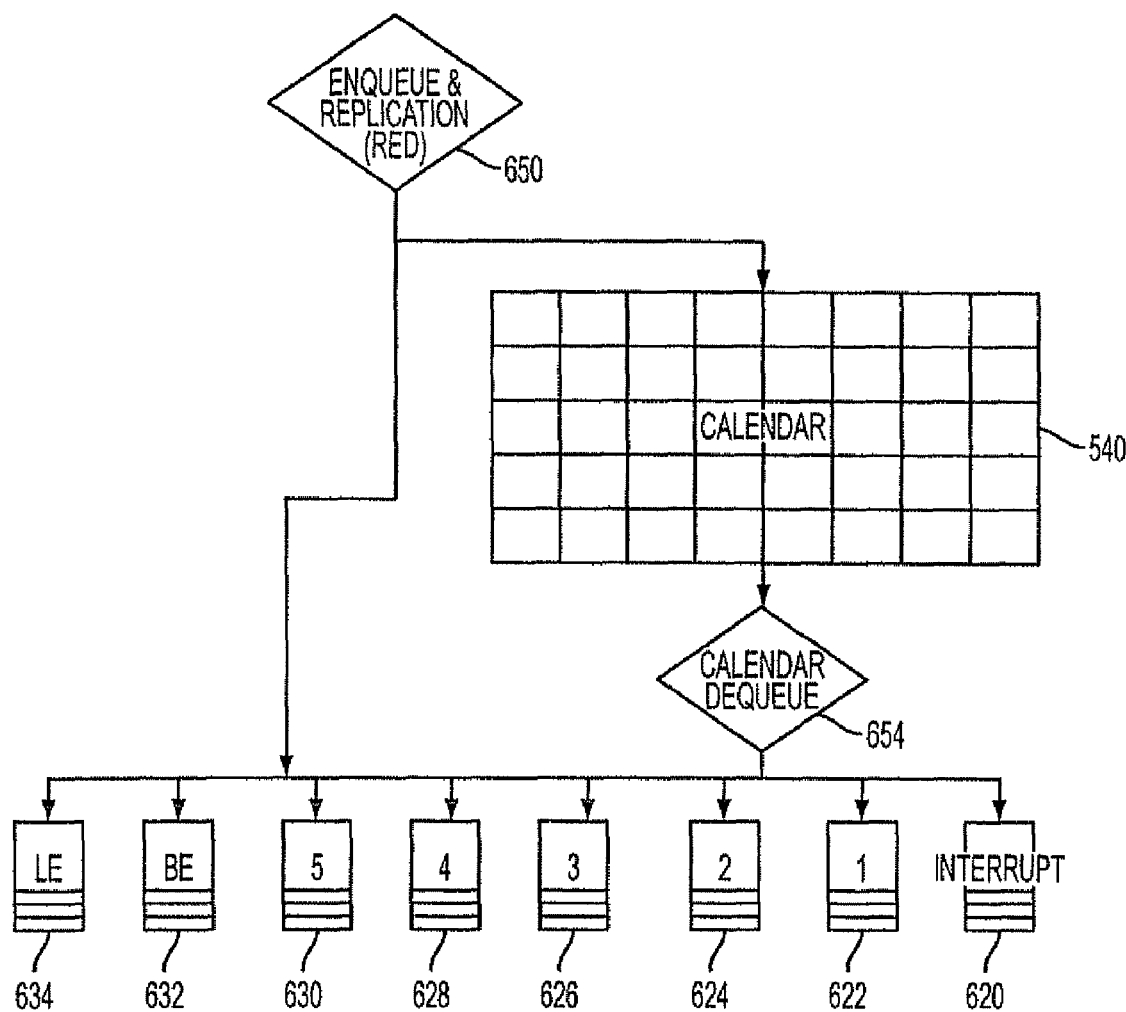
FIG. 31 illustrates the logic employed to forward data to the transmit queues.

The calendar queue 540 is a ring structure with slots corresponding to future moments in time. The calendar queue 540 has enqueue and dequeue pointers that are based on time. The dequeue pointers advance according to a time schedule based on the width of a slot and the calendar ring. The enqueue pointer points to the last slot that can safely be queued before the dequeue pointer gets to it. The two pointer advance together. Data is queued based on a desired rate such that a "future time" is calculated for the item to be queued based on the last transmit time. The "future time" cannot be less than the time slot pointed to by the enqueue pointer. The calendar queue 540 relies on the QOS table 524 to configure the calendar queue appropriately for the QOS being used The dequeue process for the calendar queue 540 is asynchronous relative to the enqueue process. The dequeue process removes all entries for the slot of the "current time" and advances the enqueue and dequeue pointers. The entries removed from the "current" slot" are placed into the queue specified by their QOS treatment. Thus, as shown in FIG. 31, data that is not subjected to passes directly to the output queues 620, 622, 624, 626, 628, 630, 632 and 634. Data that is to be encode is placed in the calendar queue for 540 until dequeued 654.

A queue scheduler 544 (in the output queue manager 570) is responsible for dequeueing data from the output queues 542. The queue scheduler 544 is provided within the output queue manager 570. The scheduler 544 implements both priority queueing and weighted round robin queueing. A programmable threshold divides priority queues from weighted round robin queues. The scheduler 544 first processes the priority queues, transmitting traffic in strict priority order. The rest of the queues are processed in weighted round robin order. The output queues are typically assigned to QOS classes, and the priority in weights on the queues configured accordingly. The priority threshold can be used to select priority queueing only or weighted round robin queuing only for all of the output queues 620, 622, 624, 626, 628, 630, 632, and 634.

The output queue manager 570 passes a ticket list and a destination handle to the encapsulation selector 576. The encapsulation 576 selector then retrieves the appropriate data from the output queues 542. The encapsulation selector 576 passes the destination handle for the selected cells to the destination description manager 580. The destination description manager 580 works in conjunction with the encapsulation engine 590 to determine how to appropriately encapsulate the data that is to be output. The destination description manager 580 accesses encapsulation RAM 578 to obtain information regarding the appropriate encapsulation for the destination. The destination description manager 580 has a destination descriptor for the destination of the output data stream. The destination handle (which accompanies every cell) is used by the destination description manager 580 to locate a destination descriptor. The destination descriptor is a field found within the destination handle that contains all of the information necessary for reencapsulation of the cell (including partial cyclic redundancy checks and information regarding the length of the frame). The encapsulation engine 590 uses an encapsulation identifier from the destination descriptor to reference a table of encapsulation descriptors 592. The encapsulation descriptor contains a pattern to be inserted into the beginning of an outgoing frame that identifies the pattern encapsulation.

The destination handle and data retrieved from the transmit data parking lot 546 of the appropriate encapsulations are gathered for ATM output. The resulting ATM cells are sent to ATM output module 594. The ATM output modules creates a correct AAL5 trailer and sets various bits in the cell. OAM 596 may be generated or outgoing OAM cells, generated by the LCP or forwarded from the receive ASIC 70, may need to be formatted. The resulting data is transmitted to the PLCP module 598. If no PLCP encapsulation is required, the cells pass through to the port transmit queue 600 without modification. Otherwise, the cells are encapsulated into PLCP frames by the PLCP module 598.

IP packets are passed to the PPP/FR output module 604, which is responsible for creating PPP frames or FR frames for encapsulating the data. The resulting frames are passed through the port transmit queues 600. Certain packets my need to passed to the LCP. The LCP packet output 606 is passed through a LCP buffer 608 and ultimately passed onto the LCP.

A SONET framer/physical interface 602 is provided for framing the data into SONET frames and for performing parallel to serial conversion. The SONNET framer/physical interface 602 provides a physical interface to the output lines. The resulting data is the output towards its descriptor.

While the present invention has been described with reference to an illustrative embodiment thereof, those skilled in the art will appreciate the various changes in form and detail may be made without departing from the intended scope of the present invention as in the appended claims.

The invention claimed is:

1. A system comprising:
a device to:
receive a data stream that is associated with an Asynchronous Transfer Mode (ATM) channel and a non-ATM channel;
delineate the received data stream to identify:
Internet Protocol (IP) packets associated with the ATM channel, and
Synchronous Optical Network (SONET) frames associated with the non-ATM data channel,
forward the identified IP packets toward destinations, and
deframe the identified SONET frames.

2. The system of claim 1, where the device includes:
a plurality of line cards communicatively coupled with each other via an interconnect, and
a SONET multiplexer/demultiplexer communicatively coupled to a first line card of the plurality of line cards.

3. The system of claim 2, where at least one line card, of the plurality of line cards, includes:
a receive Application Specific Integrated Circuit (ASIC) to:
receive data,
process the received data for transmitting over the interconnect, and
transmit the processed data to the interconnect; and
a transmit ASIC to:
receive the processed data from the interconnect, and
forward the processed data, received from the interconnect, to an output port of the device.

4. The system of claim 1, where the device is to receive a plurality of input streams, at least one input stream, of the plurality of input streams, including a plurality of tributaries, at least one tributary of the plurality of tributaries including an ATM tributary and at least one other tributary of the plurality of tributaries including a packet over SONET (PoS) tributary.

5. The system of claim 1, where the device is to receive a plurality of input streams, at least one input stream, of the plurality of input streams, including a plurality of tributaries, the plurality of tributaries including at least two of an ATM Header Error Control (HEC) delineated tributary, a DS-3

ATM Physical Layer Convergence Protocol (PLCP) delineated tributary, or a Point-to-Point Protocol (PPP) over DS-3 tributary.

6. The system of claim 1, where the device is further to:
classify IP packets based on an amount of traffic with which the IP packets are associated.

7. The system of claim 1, where the device is further to:
switch ATM cells.

8. A method performed by a network device, the method comprising:
receiving, at the network device, a data stream that is associated with an Asynchronous Transfer Mode (ATM) channel and a non-ATM channel;
delineating, by the network device, the received data stream to identify:
Internet Protocol (IP) packets associated with the ATM channel, and
Synchronous Optical Network (SONET) frames associated with the non-ATM channel;
forwarding, by the network device, the identified IP packets toward destinations; and
deframing, by the network device, the identified SONET frames.

9. The method of claim 8, where the network device includes a line card, and
where the method further comprises:
multiplexing data entering the line card, and
demultiplexing data leaving the line card.

10. The method of claim 8, where the network device includes a plurality of line cards communicatively coupled to each other via an interconnect, and
where the method further comprises:
receiving, by a line card of the plurality of line cards, first data;
processing, by the line card, the first data for transmitting over the interconnect;
transmitting the processed first data to the interconnect;
receiving second data from the interconnect; and
forwarding the second data to an output port of the network device.

11. The method of claim 8, further comprising:
receiving a plurality of input streams, at least one input stream, of the plurality of input streams, including a plurality of tributaries, at least one tributary of the plurality of tributaries including an ATM tributary and at least one other tributary of the plurality of tributaries including a packet over SONET (PoS) tributary.

12. The method of claim 8, further comprising:
receiving a plurality of input streams, at least one input stream, of the plurality of input streams, including a plurality of tributaries, the plurality of tributaries including at least two of an ATM Header Error Control (HEC) delineated tributary, a DS-3 ATM Physical Layer Convergence Protocol (PLCP) delineated tributary, or a Point-to-Point Protocol (PPP) over DS-3 tributary.

13. The method of claim 8, further comprising:
classifying IP packets based on an amount of traffic with which the IP packets are associated.

14. The method of claim 8, further comprising:
switching ATM cells.

15. A method performed by a network device, the method comprising:
receiving, by the network device, a plurality of input streams, at least one input stream, of the plurality of input streams, including a plurality of tributaries, at least one tributary of the plurality of tributaries including an ATM tributary and at least one other tributary of the plurality of tributaries including a packet over SONET (PoS) tributary;
delineating, by the network device, the received at least one input stream to identify ATM cells associated with the ATM tributary, and packets associated with the PoS tributary;
switching, by the network device, the identified ATM cells associated with the ATM tributary; and
forwarding, by the network device, the identified packets associated with the PoS tributary.

16. The method of claim 15, further comprising:
deframing SONET frames in the PoS tributary.

17. The method of claim 15, where at least one other input stream, of the plurality of input streams, includes a plurality of tributaries, the plurality of tributaries, of the at least one other input stream, including at least two of an ATM Header Error Control (HEC) delineated tributary, a DS-3 ATM Physical Layer Convergence Protocol (PLCP) delineated tributary, or a Point-to-Point Protocol (PPP) over DS-3 tributary.

18. The method of claim 15, further comprising:
multiplexing a plurality of channels to form the plurality of input streams.

19. The method of claim 15, where the switching ATM cells includes:
performing ATM lookup operations, where the switching is based on performing the ATM lookup operations.

20. The method of claim 15, where the forwarding packets includes:
performing packet lookup operations, where the forwarding is based on performing the packet lookup operations.

* * * * *